US012078138B2

(12) United States Patent
Tamane et al.

(10) Patent No.: US 12,078,138 B2
(45) **Date of Patent: *Sep. 3, 2024**

(54) REMOTE STARTUP SYSTEM, CENTER SERVER, AND REMOTE STARTUP METHOD

(71) Applicant: TOYOTA JIDOSHA KABUSHIKI KAISHA, Toyota (JP)

(72) Inventors: Yasuyuki Tamane, Miyoshi (JP); Masato Endo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,535

(22) Filed: Jul. 31, 2023

(65) Prior Publication Data

US 2023/0374963 A1 Nov. 23, 2023

Related U.S. Application Data

(63) Continuation of application No. 17/305,622, filed on Jul. 12, 2021, now Pat. No. 11,761,413, which is a (Continued)

(30) Foreign Application Priority Data

May 31, 2017 (JP) ................................ 2017-108781

(51) Int. Cl.

*F02N 11/08* (2006.01)
*G07C 5/00* (2006.01)
*G07C 5/08* (2006.01)

(52) U.S. Cl.

CPC ...... *F02N 11/0807* (2013.01); *F02N 11/0833* (2013.01); *G07C 5/008* (2013.01); *G07C 5/0841* (2013.01); *F02N 2300/306* (2013.01)

(58) Field of Classification Search

CPC ............ F02M 59/462; F02M 63/0245; F02M 63/005; F16K 17/0406

See application file for complete search history.

(56) References Cited

U.S. PATENT DOCUMENTS 3,530,846 A * 9/1970 Bean .................. F02N 11/0807 290/38 R
7,021,409 B2 * 4/2006 Tamor .................. B60W 10/06 477/3

(Continued)

FOREIGN PATENT DOCUMENTS

JP H0777141 A 3/1995
JP H0986219 A 3/1997

(Continued)

OTHER PUBLICATIONS

United States Patent and Trademark Office, Notice of Allowance issued to U.S. Appl. No. 17/305,622 on May 3, 2023.

(Continued)

*Primary Examiner* — Kurt Philip Liethen
(74) *Attorney, Agent, or Firm* — Hunton Andrews Kurth LLP

(57) ABSTRACT

A remote startup system includes: a terminal; a center server configured to receive a startup request; and a vehicle having a driving device, the vehicle configured to receive a startup request, and start up the driving device, wherein at least one of the center server and the vehicle includes an information acquisition unit configured to acquire information on transmission availability state of a power transmission device that transmits power of the driving device in the vehicle to driving wheels, or information on an operation state of a rotation prevention device that prevents rotation of the driving wheels when a function of transmitting the startup request is activated or when the startup request is transmitted, and a permission determination unit configured to (Continued)

determine whether to permit the startup of the driving device based on the startup request, based on the information acquired by the information acquisition unit.

6 Claims, 15 Drawing Sheets

Related U.S. Application Data continuation of application No. 15/991,468, filed on May 29, 2018, now Pat. No. 11,162,467.

(56) References Cited

U.S. PATENT DOCUMENTS

| | | | | |
|---|---|---|---|---|
| 10,132,259 | B1* | 11/2018 | Watson | F02N 11/101 |
| 2004/0178050 | A1* | 9/2004 | Wylde | F02N 11/0807 74/335 |
| 2007/0055415 | A1 | 3/2007 | Taki et al. | |
| 2007/0215395 | A1* | 9/2007 | Ogata | B60W 10/08 903/902 |
| 2007/0273489 | A1 | 11/2007 | Tauchi et al. | |
| 2008/0117079 | A1* | 5/2008 | Hassan | F02N 11/101 340/901 |
| 2011/0074561 | A1* | 3/2011 | Mackjust | B60R 25/10 340/5.72 |
| 2013/0151036 | A1 | 6/2013 | Harumoto et al. | |
| 2013/0261941 | A1 | 10/2013 | Nishimura et al. | |
| 2013/0345903 | A1 | 12/2013 | Nakagawa | |
| 2014/0200742 | A1 | 7/2014 | Mauti | |
| 2014/0256509 | A1* | 9/2014 | Cousins | F02N 11/0807 477/92 |
| 2014/0365057 | A1* | 12/2014 | Arita | F02D 29/02 903/903 |
| 2016/0207541 | A1 | 7/2016 | Mansur et al. | |
| 2016/0280182 | A1 | 9/2016 | Geissenhner | |
| 2018/0051758 | A1 | 2/2018 | Parada Centeno et al. | |
| 2018/0061147 | A1 | 3/2018 | Bergmann | |
| 2018/0119661 | A1* | 5/2018 | Remele | H01H 47/001 |
| 2018/0334979 | A1 | 11/2018 | Watson et al. | |
| 2018/0347532 | A1 | 12/2018 | Tamane et al. | |
| 2021/0340944 | A1 | 11/2021 | Tamane et al. | |

FOREIGN PATENT DOCUMENTS

| | | | |
|---|---|---|---|
| JP | H1082357 | A | 3/1998 |
| JP | 2001317398 | A | 11/2001 |
| JP | 2005163702 | A | 6/2005 |
| JP | 2006009650 | A | 1/2006 |
| JP | 2007310593 | A | 11/2007 |
| JP | 2009068655 | A | 4/2009 |
| JP | 2011213308 | A | 10/2011 |
| JP | 2013056577 | A | 3/2013 |
| JP | 2013203283 | A | 10/2013 |
| JP | 2013238184 | A | 11/2013 |
| JP | 2014069599 | A | 4/2014 |
| JP | 2016003646 | A | 1/2016 |
| JP | 2018204472 | A | 12/2018 |

OTHER PUBLICATIONS

United States Patent and Trademark Office, Office Action issued to U.S. Appl. No. 17/305,622 on Dec. 7, 2022.

Notice of Allowance, issued from the United States Patent and Trademark Office, to U.S. Appl. No. 18/048,157 on May 26, 2023, 9 pages.

USPTO, Office Action Issued to U.S. Appl. No. 18/048,157 on Jan. 31, 2023, 31 pages.

Advisory Action, United States Patent and Trademark Office, issued to U.S. Appl. No. 15/991,468 on Oct. 26, 2020, 3 pages.

Final Office Action, United States Patent and Trademark Office, issued to U.S. Appl. No. 15/991,468 on Jul. 21, 2020, 14 pages.

JDLink FAQs Customer Version, Apr. 2011, John Deere, p. 1, Retrieved from hllps://stellarsupport.deere.com/site_media/pdf/en/faq/jdlink/faq_custjdlink_en.pdf on Jan. 9, 2020 {Year: 2011).

Non-Final Office Action, United States Patent and Trademark Office, issued to U.S. Appl. No. 17/305,622 on Jan. 5, 2022, 12 pages.

Non-Final Office Action, United States Patent and Trademark Office, issued to U.S. Appl. No. 15/991,468 on Jan. 24, 2020, 13 pages.

Non-Final Office Action, United States Patent and Trademark Office, issued to U.S. Appl. No. 15/991,468 on Jan. 7, 2021, 15 pages.

Notice of Allowance, United States Patent and Trademark Office, issued to U.S. Appl. No. 15/991,468 on Apr. 13, 2021, 9 pages.

Notice of Allowance, United States Patent and Trademark Office, issued to U.S. Appl. No. 17/305,622 on Jul. 20, 2022, 8 pages.

USPTO, Office Action issued to U.S. Appl. No. 18/461,479 on Jun. 26, 2024, 27 pages.

* cited by examiner

REMOTE STARTUP SYSTEM, CENTER SERVER, AND REMOTE STARTUP METHOD

INCORPORATION BY REFERENCE

This is a continuation application of U.S. patent application Ser. No. 17/305,622, filed Jul. 12, 2021, which is a continuation application of U.S. patent application Ser. No. 15/991,468, filed May 29, 2018, which claims the disclosure of Japanese Patent Application No. 2017-108781 filed on May 31, 2017, including the specification, drawings and abstract are incorporated herein by reference in their entirety.

BACKGROUND

1. Technical Field

The present disclosure relates to a remote startup system, a center server, and a remote startup method.

2. Description of Related Art

A center type remote startup system that starts up a driving device such as an engine mounted on a vehicle in response to a startup request transmitted from a portable communication terminal device carried by a user to a remotely located vehicle via a center server has been known (see, for example, Japanese Unexamined Patent Application Publication No. 2013-238184 (JP 2013-238184 A)).

SUMMARY

However, in the center type remote startup system, a user can start up a driving device such as an engine of a vehicle from a position at which the vehicle cannot be visually recognized. Thus, for example, it is desirable to start up the driving device in consideration of, for example, whether or not a power transmission device such as a transmission of the vehicle is in a state in which the power transmission device cannot transmit power to driving wheels, or whether or not a rotation prevention device that prevents rotation of the driving wheels such as a parking brake of the vehicle operates.

The present disclosure provides a center type remote startup system, a center server, and a remote startup method capable of starting up a driving device mounted on a vehicle in consideration of a transmission availability state of a power transmission device, an operation state of a rotation prevention device, and the like of a vehicle.

A first aspect of the present disclosure relates to a remote startup system including: a terminal; a center server configured to communicate with the terminal and receive a startup request from the terminal; and a vehicle on which a driving device is mounted, the vehicle being configured to communicate with the center server, receive a startup request for the driving device from the center server, and start up the driving device. At least one of the center server and the vehicle includes: an information acquisition unit configured to acquire information on transmission availability state of a power transmission device that transmits power of the driving device in the vehicle to driving wheels, or information on an operation state of a rotation prevention device that prevents rotation of the driving wheels when a function of transmitting the startup request included in the terminal is activated or when the startup request is transmitted from the terminal to the center server, and a permission determination unit configured to determine whether or not to permit the startup of the driving device based on the startup request, based on the information acquired by the information acquisition unit.

According to the first aspect of the present disclosure, the information on the operation state of the power transmission device or the rotation prevention device of the vehicle is acquired, and a determination is made as to whether or not the startup of the driving device such as an engine of the vehicle based on the startup request transmitted from the terminal to the center server is permitted, based on the acquired information. Thus, a configuration in which the startup of the driving device of the vehicle based on the startup request transmitted from the terminal to the center server is not permitted in a case where the power transmission device of the vehicle can transmit the power of the driving device to the driving wheels or in a case where the rotation prevention device of the vehicle is released, for example, can be adopted. Therefore, it is possible to start up the driving device in consideration of the transmission availability state of the power transmission device, the operation state of the rotation prevention device, and the like of the vehicle.

In the remote startup system according to the first aspect of the present disclosure, at least one of the center server and the vehicle may further include a controller configured to start up the driving device when the startup request is transmitted from the terminal to the center server and the permission determination unit has permitted the startup of the driving device based on the startup request.

According to the first aspect of the present disclosure, specifically, it is possible to reliably perform the startup of the driving device based on the startup request transmitted from the terminal to the center server solely when the startup of the driving device has been permitted in consideration of the operation state of the power transmission device or the rotation prevention device of the vehicle.

In the remote startup system according to the first aspect of the present disclosure, at least one of the center server and the vehicle may further include an availability notification transmission unit configured to transmit a notification indicating whether or not the startup of the driving device based on the startup request is permitted to the terminal. The center server or the vehicle may include the permission determination unit. The availability notification transmission unit may be configured to transmit a startup availability notification indicating that the startup is available to the terminal when the permission determination unit determines that the startup of the driving device based on the startup request is permitted, and transmit a startup unavailability notification indicating that the startup is unavailable to the terminal when the permission determination unit determines that the startup of the driving device based on the startup request is not permitted.

According to the first aspect of the present disclosure, in a case where a determination is made as to whether or not to permit the startup of the driving device in consideration of the operation state of the power transmission device or the rotation prevention device of the vehicle in the center server or the vehicle, the notification related to the determination result is transmitted to the terminal. Thus, it is possible to notify the user of the terminal of the determination result, for example, through a display on the display unit of the terminal.

In the remote startup system according to the first aspect of the present disclosure, the terminal may further include a display unit. The information acquisition unit may be configured to acquire the information when the function is activated. The display unit may be configured to display an operation screen for performing startup of the driving device based on the startup request when the startup availability notification is received.

According to the first aspect of the present disclosure, when the startup of the driving device based on the startup request is permitted, the operation screen for automatically performing the startup of the driving device based on the startup request is displayed on the display unit of the terminal. The operation screen may include, for example, an operation icon for transmitting the startup request. Therefore, the user can recognize that the startup of the driving device based on the startup request has been performed without manual inquiry. Further, when the startup of the driving device based on the startup request has been permitted, it is possible to further improve convenience for the user since an effort of the user such as a manual operation of displaying the operation screen on the display unit is reduced.

In the remote startup system according to the first aspect of the present disclosure, the terminal may further include a display unit configured to display an indication that the startup of the driving device based on the startup request is unavailable when the startup unavailability notification is received.

According to the first aspect of the present disclosure, when the startup of the driving device based on the startup request has not been permitted, the fact that the startup of the driving device based on the startup request is unavailable is automatically displayed on the display unit of the terminal. Therefore, the user can confirm that the startup of the driving device based on the startup request has not been permitted without manual inquiry about a permission result.

In the remote startup system according to the first aspect of the present disclosure, the terminal may further include a startup request transmission unit configured to transmit the startup request to the center server according to a predetermined operation by a user when the startup availability notification is received.

According to the first aspect of the present disclosure, in a case where the startup of the driving device based on the startup request has been permitted, the center server is interposed and confirms the transmission of the startup request from the terminal to the center server, that is, an intention of the startup of the driving device of the user, and then, the driving device of the vehicle can be started up. Thus, it is possible to effectively prevent useless startup of the driving device, for example, in a case where the intention of the user has changed during the permission determination process.

In the remote startup system according to the first aspect of the present disclosure, at least one of the center server and the vehicle may further include a cancelation unit configured to cancel, in a case where the startup request is transmitted from the terminal to the center server and the driving device is started up and being operated, the startup request when the vehicle has traveled or when an operation corresponding to a stage before traveling of the vehicle is performed with respect to the vehicle.

According to the first aspect of the present disclosure, in a state in which the driving device is started up based on the startup request and being operated, even when the vehicle has traveled or an operation of the user corresponding to a stage before the traveling of the vehicle such as unlock or opening of the door of the vehicle is performed, the startup request is invalidated. Therefore, for example, when the vehicle travels while the startup request remains valid without stopping after the driving device is started up based on the startup request, the startup of the driving device based on the startup request is likely to be performed again against an intention of the user when the vehicle travels for a very short time within a range of a valid time and the vehicle is parked again in a case where the valid time is defined in the startup request. Thus, it is possible to effectively avoid the situation as described above.

In the remote startup system according to the first aspect of the present disclosure, at least one of the center server and the vehicle may further include a cancelation notification transmission unit. The center server or the vehicle may include the cancelation unit. One of the center server and the vehicle including the cancelation unit may include the cancelation notification transmission unit. One of the center server and the vehicle including the cancelation unit may be configured to transmit a cancelation notification indicating that the startup request has been canceled by the cancelation unit to the terminal.

According to the first aspect of the present disclosure, in a case where a process of canceling a valid startup request is performed in the center server or the vehicle, the cancelation notification is transmitted to the terminal when the valid startup request is canceled. Thus, it is possible to notify a user of the terminal that the valid startup request has been canceled, for example, by a display on the display unit of the terminal.

A second aspect of the present disclosure relates to a center server configured to communicate with a terminal and a vehicle, receive a startup request of a driving device mounted on a vehicle, the startup request being transmitted from the terminal, and start up the driving device based on the startup request. The center server includes a vehicle information acquisition unit configured to transmit, to the vehicle, an acquisition request for requesting acquisition of information on transmission availability state of a power transmission device that transmits power of the driving device in the vehicle to driving wheels, or information on an operation state of a rotation prevention device that prevents rotation of the driving wheels when an activation notification indicating that a function of transmitting the startup request included in the terminal is activated or the startup request is received from the terminal; and a permission determination unit configured to determine whether or not to permit the startup of the driving device based on the startup request, based on the information on an operation state of the power transmission device or the rotation prevention device received from the vehicle.

A third aspect of the present disclosure relates to a remote startup method that is executed by a remote startup system including a terminal, a center server configured to communicate with the terminal, and a vehicle configured to communicate with the center server, the remote startup system being configured to start up a driving device mounted on the vehicle based on a startup request transmitted from the terminal to the center server. The remote startup method includes: acquiring, by at least one of the center server and the vehicle, information on transmission availability state of a power transmission device that transmits power of the driving device in the vehicle to driving wheels, or information on an operation state of a rotation prevention device that prevents rotation of the driving wheels when a function of transmitting the startup request included in the terminal is activated or a case where the startup request is transmitted from the terminal to the center server; and determining, by at least one of the center server and the vehicle, whether or not to permit the startup of the driving device based on the startup request, based on the information acquired in the acquiring of information.

According to the aspects of the present disclosure, it is possible to provide a center type remote startup system, a center server, and a remote startup method capable of starting up a driving device mounted on a vehicle in consideration of a transmission availability state of a power transmission device, an operation state of a rotation prevention device, and the like of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, modes for carrying out the disclosure will be described with reference to the drawings.

First Embodiment

Configuration of Remote Startup System

First, a configuration of a remote startup system 1 according to the first embodiment will be described with reference to FIGS. 1 to 4.

Figure 1:
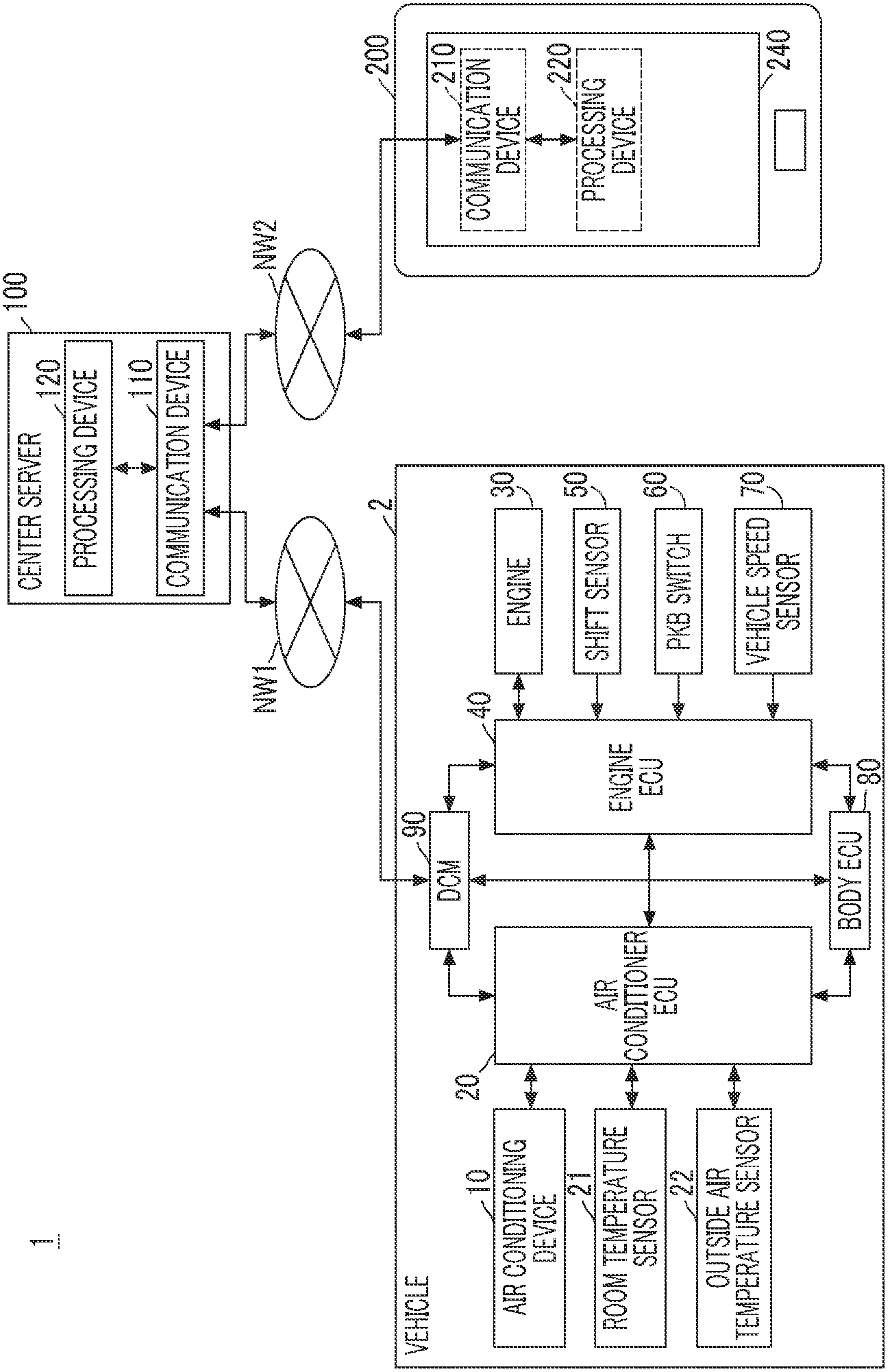
FIG. 1 is a configuration diagram illustrating an example of a configuration of a remote startup system.
Figure 2:
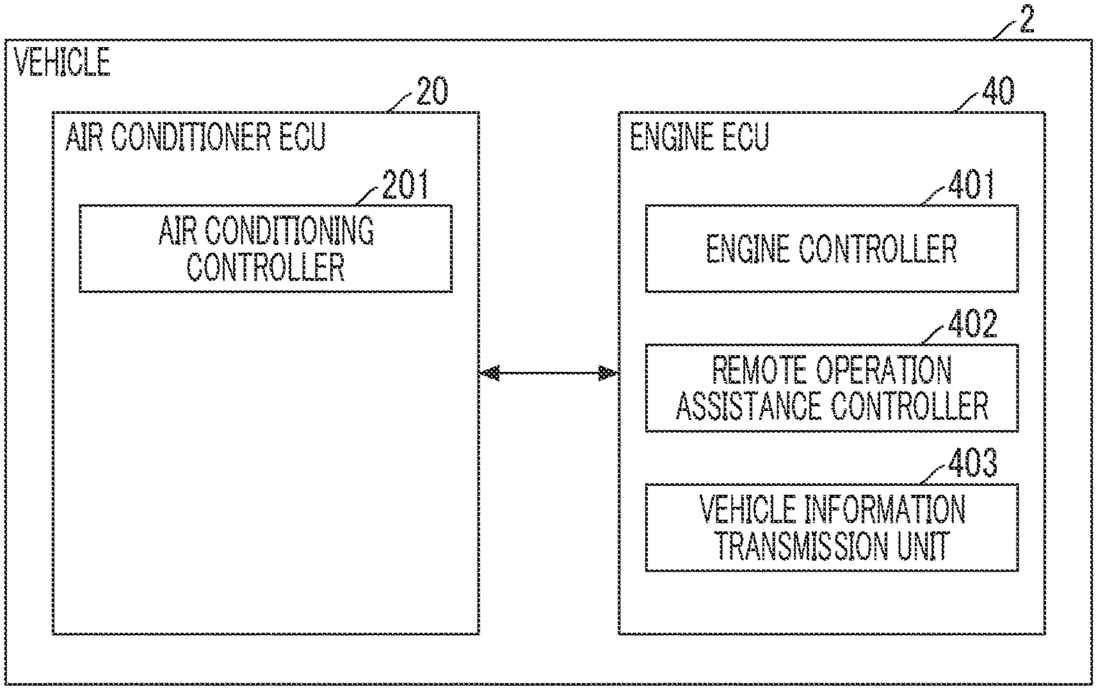
FIG. 2 is a functional block diagram illustrating an example of a functional configuration of a vehicle (an air conditioner ECU and an engine ECU) according to a first embodiment.
Figure 3:
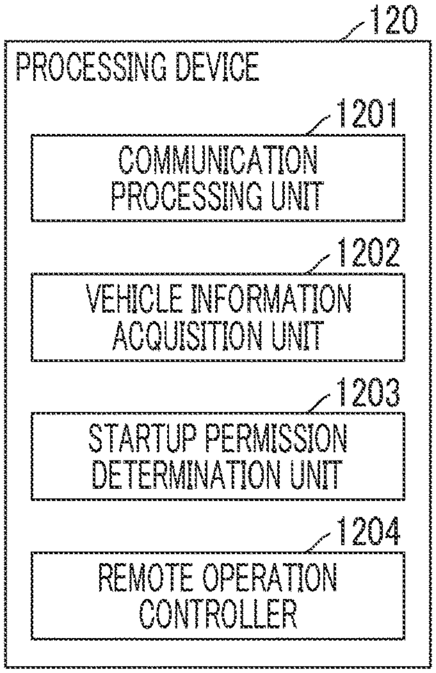
FIG. 3 is a functional block diagram illustrating an example of a functional configuration of a center server (a processing device) according to the first embodiment.
Figure 4:
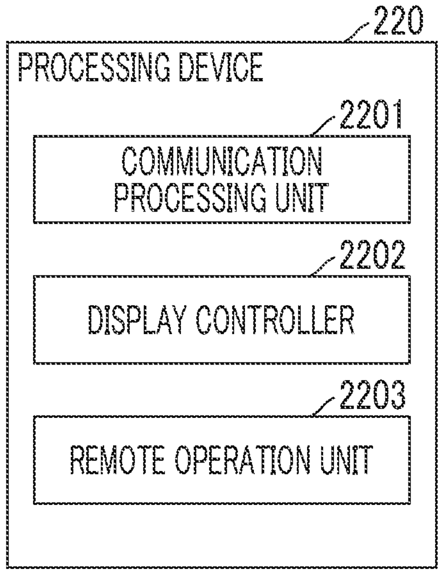
FIG. 4 is a functional block diagram illustrating an example of a functional configuration of a terminal (a processing device) according to the first embodiment.

FIG. 1 is a configuration diagram illustrating an example of a configuration of the remote startup system 1 according to the first embodiment. FIG. 2 is a functional block diagram illustrating an example of a functional configuration of a vehicle 2 (an air conditioner electronic control unit (ECU) 20 and an engine ECU 40) according to the first embodiment. FIG. 3 is a functional block diagram illustrating an example of a functional configuration of a center server 100 (a processing device 120) according to the first embodiment. FIG. 4 is a functional block diagram illustrating an example of a functional configuration of a terminal 200 (a processing device 220) according to the first embodiment.

The remote startup system 1 includes the vehicle 2, the center server 100, and the terminal 200 carried by a user, and starts up an engine 30 and an air conditioning device 10 to be described below of the vehicle 2 based on a startup request for a driving device (hereinafter referred to as a "startup request") that is transmitted from the terminal 200 to the center server 100.

The center server 100 provides a service for starting up the engine and the air conditioning device 10 (hereinafter referred to as a "remote startup service") in response to the startup request that is transmitted from the terminal carried by the user, for a plurality of vehicles. The vehicle 2 representatively indicates one of a plurality of vehicles that is a target of the center server 100.

The vehicle 2 includes an air conditioning device 10, the air conditioner ECU 20, a room temperature sensor 21, an outside air temperature sensor 22, the engine 30, the engine ECU 40, a shift sensor 50, a parking brake switch (PKB switch) 60, a vehicle speed sensor 70, a body ECU 80, and a data communication module (DCM) 90.

The air conditioning device 10 adjusts, for example, a temperature in the cabin of the vehicle 2. The air conditioning device 10 includes, for example, a refrigerating cycle including an evaporator (not illustrated) and a compressor (not illustrated) that is driven by the engine 30, and a heater (not illustrated) using coolant of the engine 30 as a heat source. Under the control of the air conditioner ECU 20 (an air conditioning controller 201 to be described below), the air conditioning device 10 adjusts a temperature of air sent out from an air outlet by appropriately setting a ratio of air cooled by passing through the evaporator (cold air) to air warmed using the coolant of the engine 30 as a heat source (hot air) in a changeable manner. Further, the air conditioning device 10 has a defroster mode, and removes frost that is generated on the outdoor side of a windshield of the vehicle 2 or fog generated on the cabin-side of the windshield of the vehicle 2 by sending air having a relatively low humidity and a relatively high temperature along the windshield of the vehicle 2 from the air outlet corresponding to the defroster mode.

The room temperature sensor 21 is provided in the cabin of the vehicle 2, such as the inside of an instrument panel (not illustrated), and detects a temperature in the cabin of the vehicle 2 (room temperature). The room temperature sensor 21 is communicatably connected to the air conditioner ECU 20 via a one-to-one communication line or the like. A detection signal corresponding to the room temperature of the vehicle 2 detected by the room temperature sensor 21 is input to the air conditioner ECU 20.

The outside air temperature sensor 22 is provided on an outdoor side of the vehicle 2 such as a front end portion of an engine compartment provided in a front portion of the vehicle 2 (a portion into which outside air is introduced), that is, on the back side of a front grille of the vehicle 2, and detects a temperature of the outdoor side (outside air temperature) of the vehicle 2. The outside air temperature sensor 22 is communicatably connected to the air conditioner ECU 20 via a one-to-one communication line or the like, and a detection signal corresponding to the detected outdoor air temperature is input to the air conditioner ECU 20.

The air conditioner ECU 20 is an electronic control unit that performs various controls regarding the air conditioning device 10. The function of the air conditioner ECU 20 may be realized by hardware, software, or a combination of the hardware and the software. The air conditioner ECU 20 may be mainly configured of, for example, a microcomputer including a central processing unit (CPU), a random access memory (RAM), a read only memory (ROM), an auxiliary storage device, an input-output interface (I/O), and the like. Hereinafter, the same applies to the engine ECU 40. The air conditioner ECU 20 includes, for example, an air conditioning controller 201 as a functional unit that is realized by executing one or more programs stored in a ROM, an auxiliary storage device, or the like on the CPU.

The air conditioning controller 201 controls an operation of the air conditioning device 10 according to a set state of a set temperature, a mode (a plurality of air outlet modes according to a combination of the air outlets or defroster mode), and the like. Specifically, the air conditioning controller 201 controls the operation of the air conditioning device 10, for example, so that the room temperature of the vehicle 2 becomes the set temperature, based on a detected value of the room temperature sensor 21, the outside air temperature sensor 22, and the like. Further, the air conditioning controller 201 starts up the air conditioning device 10 according to an air conditioning startup request from a remote operation assistance controller 402 to be described below and controls the operation of the air conditioning device 10 according to setting content included in the air conditioning startup request.

Various ECUs including the air conditioner ECU 20, the engine ECU 40, and the body ECU 80, and the DCM 90 are communicatably connected to each other over an in-vehicle network based on a communication protocol of a controller area network (CAN) or the like.

The engine 30 (an example of a driving device) is a driving force source of the vehicle 2, and is a driving force source of the air conditioning device 10, specifically, the compressor in a refrigerating cycle of the air conditioning device 10. The engine 30 is operated by burning gasoline, light oil, or the like supplied from a fuel tank (not illustrated) via a fuel pump (not illustrated) in a cylinder under the control of the engine ECU 40. The engine 30, specifically, various actuators (a fuel injection device that injects fuel, an ignition device that ignites gasoline injected into the cylinder, an electric motor for changing an opening and closing timing of an intake or exhaust valve, or the like) assembled in the engine 30 are communicatably connected to the engine ECU 40 via a one-to-one communication line or the like, and are operated according to a control command transmitted from the engine ECU 40.

The engine ECU 40 is an electronic control unit that performs various control processes of the engine 30 including a starter (not illustrated). The engine ECU 40 includes, for example, an engine controller 401, a remote operation assistance controller 402, and a vehicle information transmission unit 403 as functional units that are realized by executing one or more programs stored in a ROM, an auxiliary storage device, or the like.

The engine controller 401 performs operation control of the engine 30 according to an operation state by a driver of the vehicle 2 (for example, an accelerator operation amount or a selected gear shift stage of a transmission (not illustrated)), an environmental state of surroundings of the vehicle 2 (for example, an outside air temperature), or the like. For example, when an ignition switch (IG switch) is turned ON (IG-ON) or when an engine startup request is input from the outside, the engine controller 401 starts up the engine 30. Specifically, the engine controller 401 switches a relay (not illustrated) for energizing a starter to a connected state to drive the starter, and appropriately controls a fuel injection device and an ignition device according to cranking by the starter to start up the engine 30.

According to a startup request that is received from the terminal 200 via the center server 100, the remote operation assistance controller 402 transmits an engine startup request and an air conditioning startup request to the engine controller 401 and the air conditioning controller 201, respectively, to start up the engine 30 and the air conditioning device 10. Further, when a predetermined end condition is satisfied after the engine 30 and the air conditioning device 10 are started up, the remote operation assistance controller 402 transmits an engine stop request and an air conditioning stop request to the engine controller 401 and the air conditioning controller 201, respectively, to stop the air conditioning device 10 and the engine 30. For example, when a set operation time included in the startup request or defined in advance has elapsed from the startup of the engine 30 and the air conditioning device 10 as an end condition, the remote operation assistance controller 402 may stop the air conditioning device 10 and the engine 30. For example, when the room temperature has been determined to have reached a set temperature included in the startup request or defined in advance after the startup of the engine 30 and the air conditioning device 10 as an end condition, the remote operation assistance controller 402 may stop the air conditioning device 10 and the engine 30. Further, for example, when a signal indicating that an operation for stopping the engine 30 and the air conditioning device 10 has been executed has been received from the terminal 200 via the center server 100 by the DCM 90 as an end condition, the remote operation assistance controller 402 may stop the air conditioning device 10 and the engine 30.

A function of the remote operation assistance controller 402 may be provided in the air conditioner ECU 20 or may be provided in another ECU that can communicate with the air conditioner ECU 20 and the engine ECU 40 via an in-vehicle network based on a communication protocol such as a CAN.

The vehicle information transmission unit 403 acquires vehicle information input from various sensors or the like from, for example, a buffer of the RAM and transmits the vehicle information to the center server 100 via the DCM 90. In the first embodiment, the vehicle information transmission unit 403 transmits information corresponding to the output signals input from the shift sensor 50 and the PKB switch 60, that is, the shift position information of a transmission (not illustrated) of the vehicle 2, the information on the presence or absence of an operation of a parking brake (not illustrated) of the vehicle 2 (PKB operation information), and the like to the center server 100 via the DCM 90 in response to the vehicle information acquisition request received from the center server 100 by the DCM 90.

The shift sensor 50 detects a shift position selected in a transmission (an example of a power transmission device of the vehicle) mounted on the vehicle 2. In the case of an automatic transmission, the shift position of the transmission includes, for example, a P range, a D range, an N range, and an R range. In the transmission, since a determination is made as to whether or not the power of the engine 30 is transmitted to the driving wheels according to the shift position, the shift position information indicates a power transmission availability state of the transmission from the engine 30 to the driving wheels (any one of transmission available state or a transmission unavailable state). The shift sensor 50 is communicatably connected to, for example, the engine ECU 40 through the in-vehicle network based on a communication protocol such as a one-to-one communication line or a CAN, and an output signal corresponding to the detected shift position is input to the engine ECU 40.

The PKB switch 60 outputs an ON signal or an OFF signal corresponding to the operation state (any one of an operation state and a release state) of a mechanical or electric parking brake (an example of a rotation prevention device) mounted on the vehicle 2. The PKB switch 60 is communicatably connected to the engine ECU 40 via the in-vehicle network based on the communication protocol such as the one-to-one communication line and the CAN, and an output signal (an ON signal or an OFF signal) corresponding to the operation state of the parking brake is input to the engine ECU 40.

The vehicle speed sensor 70 detects the vehicle speed of the vehicle 2. The vehicle speed sensor 70 is communicatably connected to, for example, the engine ECU 40 via the in-vehicle network based on the communication protocol such as the one-to-one communication line or the CAN, and an output signal corresponding to the detected vehicle speed is input to the engine ECU 40.

The body ECU 80 is an electronic control unit that drives an actuator (not illustrated) (for example, a door lock motor) that locks or unlocks the door of the vehicle 2 and controls a locked or unlocked state of the door of the vehicle 2. The door of the vehicle 2 includes a side door for allowing an occupant to get in and out of a cabin of the vehicle 2, a back door for access to a luggage room, and a trunk lid. Hereinafter, a state in which the vehicle 2 is locked means a state in which a plurality of doors of the vehicle 2 is locked. A state in which the door of the vehicle 2 is unlocked means a state in which at least one of the doors is unlocked.

For example, when an unlock signal in a radio frequency (RF) band wirelessly transmitted from an electronic key to the vehicle 2 is received by a tuner (not illustrated) mounted on the vehicle 2, the body ECU 80 unlocks the door of the vehicle 2 in response to a command from a collation ECU (not illustrated) that performs an authentication process for the unlock signal.

Further, for example, the body ECU 80 unlocks the door of the vehicle 2 in response to a command from the collation ECU that performs an authentication process through exchange of a radio signal with the electronic key when a user carrying the electronic key operates a trigger switch provided on, for example, the door of the vehicle 2.

Further, for example, the body ECU 80 periodically outputs state information on a locked or unlocked state of the door of the vehicle 2, that is, state information indicating whether the door is locked or unlocked to the engine ECU 40 or the like via the in-vehicle network such as the CAN.

The DCM 90 is, for example, a communication device that bidirectionally communicates with the center server 100 over a predetermined communication network NW1 including a mobile phone network including a plurality of base stations as ends, an Internet network, or the like (hereinafter, the sample applies to a communication network NW2). As described above, the DCM 90 is mutually communicatably connected to various ECUs such as the air conditioner ECU 20, the engine ECU 40, and the body ECU 80 over an in-vehicle network such as a CAN.

The center server 100 is interposed between the vehicle 2 and the terminal 200 carried by the user, and performs control regarding a remote operation of the vehicle 2 using the terminal 200 by the user, specifically, control regarding the startup of the engine 30 of the vehicle 2 based on a remote operation from the terminal 200. The center server 100 includes a communication device 110 and a processing device 120.

The communication device 110 is a device that bidirectionally communicates with the vehicle 2 (specifically, the DCM 90) and the terminal 200 over the communication networks NW1 and NW2 under the control of the processing device 120 (specifically, the communication processing unit 1201).

The processing device 120 executes various control processes in the center server 100. The function of the processing device 120 may be realized by hardware, software, or a combination of the hardware and the software. The processing device 120, for example, may be mainly configured of one or a plurality of server computers each including a CPU, a RAM, a ROM, an auxiliary storage device, an I/O, and the like. The processing device 120 includes, for example, a communication processing unit 1201, a vehicle information acquisition unit 1202, a startup permission determination unit 1203, and a remote operation controller 1204, as functional units that are realized by executing one or more programs stored in the ROM or the auxiliary storage device on the CPU.

The communication processing unit 1201 controls the communication device 110 to transmit and receive various signals (control signals, information signals, or the like) to and from the vehicle 2 and the terminal 200.

The vehicle information acquisition unit 1202 (an example of an information acquisition unit) transmits the vehicle information acquisition request for requesting the acquisition of the vehicle information to the vehicle 2 via the communication processing unit 1201, to thereby acquire the vehicle information received from the vehicle 2 via the communication processing unit 1201. Specifically, the vehicle information acquisition unit 1202 acquires the shift position information indicating the power transmission availability state of the transmission that transmits the power from the engine 30 of the vehicle 2 to the driving wheels, and information on the operation state of the parking brake (PKB operation information) that prevents the rotation of the driving wheels of the vehicle 2 via the communication processing unit 1201.

The startup permission determination unit 1203 (an example of a permission determination unit) determines whether or not the startup of the engine 30 based on the startup request received from the terminal 200 by the communication processing unit 1201 is permitted based on the shift position information and the PKB operation information acquired by the vehicle information acquisition unit 1202. For example, when the transmission of the vehicle 2 is in a state in which the transmission of the vehicle 2 cannot transmit the power of the engine 30 to the driving wheels, and the parking brake is operating, the startup permission determination unit 1203 permits the startup of the engine 30 based on the startup request. In a case where the shift position information indicates that the shift position information is, for example, a P range of an automatic transmission, an N range of the automatic transmission, or a neutral position of a manual transmission, the transmission of the vehicle 2 corresponds to a state in which the transmission of the vehicle 2 transmits the power of the engine 30 to the driving wheels. On the other hand, when the transmission of the vehicle 2 is in a state in which the transmission of the vehicle 2 can transmit the power of the engine 30 to the driving wheels, or when the parking brake is not operated, that is, when the parking brake is released, the startup permission determination unit 1203 does not permit the startup of the engine 30 based on the startup request. In a case where the shift position information indicates that the shift position information is, for example, a D range of the automatic transmission, an R range of the automatic transmission, or a position corresponding to each gear stage of the manual transmission, the transmission of the vehicle 2 corresponds to a state in which the transmission of the vehicle 2 transmits the power of the engine 30 to the driving wheels. As described above, in a situation in which the vehicle 2 starts to move, such as a case where the transmission of the vehicle 2 can transmit the power of the engine 30 to the driving wheels, a case where the parking brake is not operated, the startup of the engine 30 is not permitted so that the engine 30 cannot be started up.

The remote operation controller 1204 (an example of a controller) performs control regarding the startup of the engine 30 based on the startup request received from the terminal 200 by the communication processing unit 1201. For example, in a case where the startup request is received from the terminal 200 by the communication processing unit 1201, and the startup permission determination unit 1203 permits the startup of the engine 30 based on the startup request, the remote operation controller 1204 transmits the startup request to the vehicle 2 via the communication processing unit 1201, and starts up the engine 30 and the air conditioning device 10. On the other hand, even when the startup request from the terminal 200 is received by the communication processing unit 1201, in a case where the startup of the engine 30 based on the startup request is not permitted by the startup permission determination unit 1203, the remote operation controller 1204 does not start up the engine 30. The remote operation controller 1204 transmits a notification that the startup of the engine 30 is unavailable to the terminal 200 via the communication processing unit 1201.

The terminal 200, for example, transmits the startup request for the engine 30 according to a predetermined operation input from the user to perform a remote operation regarding the startup of the vehicle 2. The terminal 200 is, for example, a mobile terminal such as a smartphone or a tablet terminal carried by a user of the vehicle 2. Further, the terminal 200 may be a stationary terminal carried by the user of the vehicle 2, such as a desktop type computer terminal. The terminal 200 includes a communication device 210, a processing device 220, and a touch panel display (hereinafter simply referred to as a "display") 240.

The communication device 210 is a device that performs bidirectional communication with the center server 100 over the communication network NW2 under the control of the processing device 220 (specifically, a communication processing unit 2201 to be described below) and is, for example, a Long Term Evolution (LTE) module.

The processing device 220 performs various control processes in the terminal 200. The processing device 220 may be mainly configured of, for example, a computer including a CPU, a RAM, a ROM, an auxiliary storage device, an I/O, and the like. The processing device 220 includes, for example, a communication processing unit 2201, a display controller 2202, and a remote operation unit 2203, as functional units that are realized by executing one or more programs stored in the ROM, the auxiliary storage device, or the like on the CPU.

The communication processing unit 2201 controls the communication device 210 and transmits and receives various signals to and from the center server 100.

The display controller 2202 displays various images on the display 240. For example, the display controller 2202 displays various graphical user interfaces (GUIs) as operation screens on the display 240.

The remote operation unit 2203 executes various processes regarding a remote operation of the engine 30 and the air conditioning device 10 according to a predetermined operation of the user with respect to a predetermined GUI displayed on the display 240 by the display controller 2202. A function of the remote operation unit 2203 becomes available, for example, by activating a predetermined application program (hereinafter referred to as "remote operation application") installed in the terminal 200 (the processing device 220) according to a predetermined operation of the user.

For example, the remote operation unit 2203 transmits various signals regarding the remote operation of the vehicle 2 including a startup request for requesting the startup of the engine 30 and the air conditioning device 10 to the center server 100 via the communication processing unit 2201 according to a predetermined operation of the user with respect to various GUIs displayed on the display 240 due to the activation of the remote operation application. As described above, a startup request transmitted to the center server 100 is received by the center server 100, the startup request is transmitted to the vehicle 2 under control of the center server 100 (specifically, the remote operation controller 1204), and the engine 30 and the air conditioning device 10 are started up. Further, for example, the user can set various settings when operating the air conditioning device 10 on a predetermined GUI, and the remote operation unit 2203 transmits various signals such as a startup request including the various settings to the center server 100. As described above, in the vehicle 2, control of the air conditioning device 10 based on the setting content (for example, a set temperature as a requested value of the room temperature of the vehicle by the user, or a set operation time as a requested value of an operation time of the air conditioning device 10 by the user) is performed.

Detailed Operation of Remote Startup System

A specific operation of the remote startup system 1 will be described with reference to FIGS. 5A to 10.

Figure 5A:
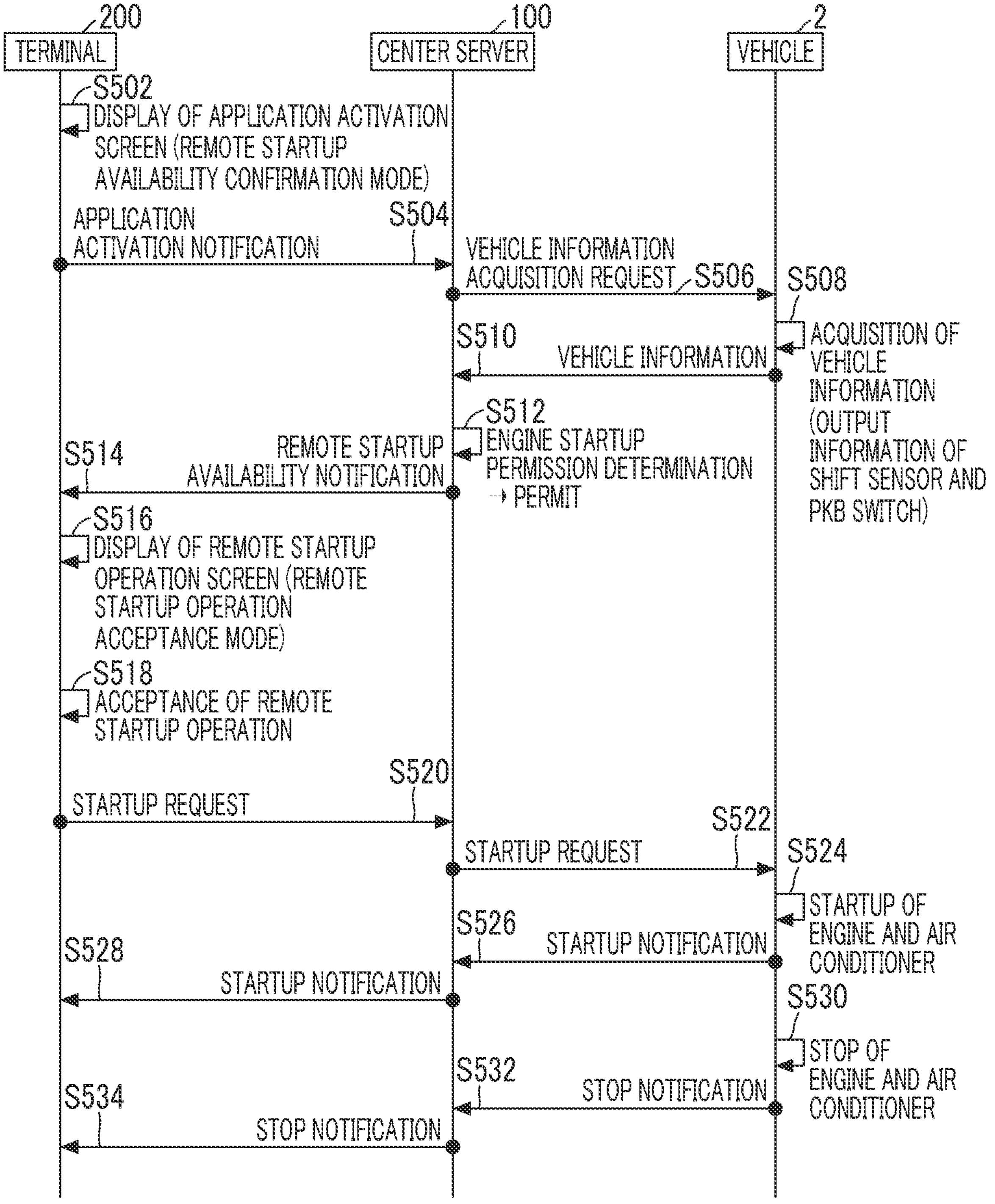
FIG. 5A is a sequence diagram illustrating an example of an operation of the remote startup system according to the first embodiment.
Figure 5B:
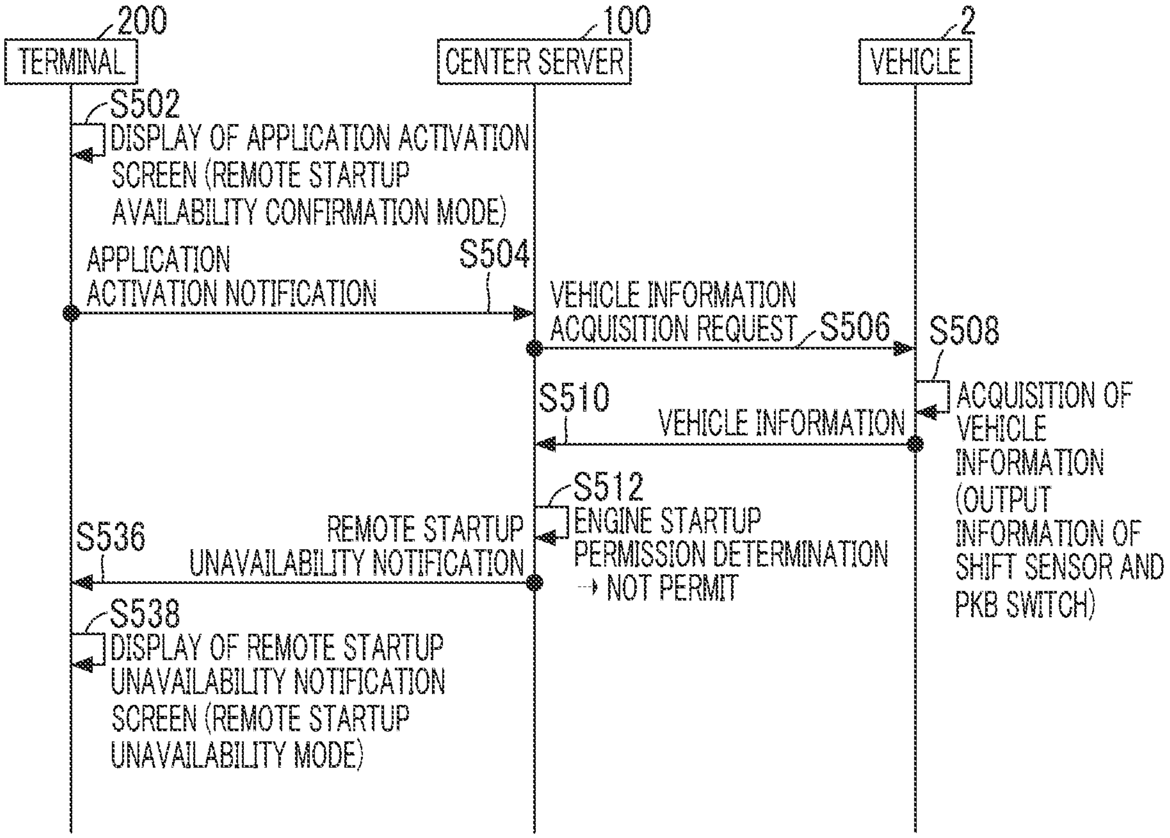
FIG. 5B is a sequence diagram illustrating an example of the operation of the remote startup system according to the first embodiment.

FIGS. 5A and 5B are sequence diagrams schematically illustrating an example of the operation of the remote startup system 1 according to the first embodiment. Specifically, FIG. 5A is a sequence diagram illustrating a specific example of the operation of the remote startup system 1 in a case where the startup permission determination unit 1203 has permitted startup of the engine 30 based on the startup request. FIG. 5B is a sequence diagram illustrating a specific example of the operation of the remote startup system 1 in a case where the startup permission determination unit 1203 does not permit the startup of the engine 30 based on the startup request.

In FIGS. 5A and 5B, since steps S502 to S512 are the same processes, redundant description will be omitted.

Referring to FIG. 5A, in step S502, when the remote operation application is activated in response to a predetermined operation of the user with respect to the terminal 200, the display controller 2202 of the terminal 200 displays an activation screen of the remote operation application (an application activation screen). The terminal 200 shifts to a mode for confirming whether or not the engine 30 can be started up based on the startup request (a remote startup availability confirmation mode).

Figure 6:
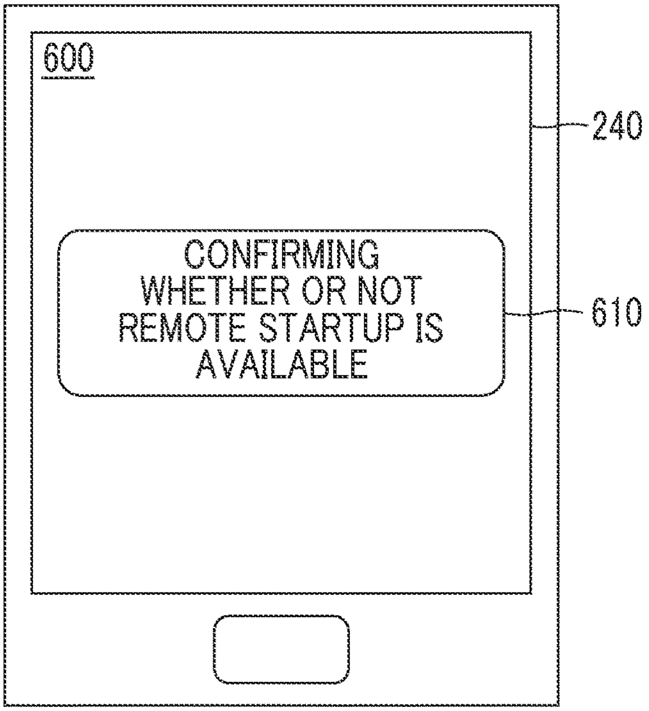
FIG. 6 is a diagram illustrating an example of an application activation screen.

For example, FIG. 6 is a diagram illustrating an example (an application activation screen 600) of the application activation screen.

As illustrated in FIG. 6, a pop-up 610 is displayed in a vertically central portion of the application activation screen 600 of the display 240. A notification indicating that a confirmation is being made as to whether the engine 30 can be started up based on the startup request from the terminal 200 is displayed in the pop-up 610.

Referring back to FIG. 5A, in step S504, the communication processing unit 1201 of the terminal 200 transmits a notification indicating that the remote operation application has been activated (an application activation notification) to the center server 100 in response to a request from the remote operation unit 2203 according to the activation of the remote startup application.

In step S506, when the vehicle information acquisition unit 1202 of the center server 100 receives the application activation notification from the terminal 200 using the communication processing unit 1201, the vehicle information acquisition unit 1202 of the center server 100 transmits a vehicle information acquisition request to the vehicle 2 via the communication processing unit 1201.

In step S508, when the vehicle information acquisition request from the center server 100 is received by the DCM 90, the vehicle information transmission unit 403 of the vehicle 2 acquires vehicle information, that is, shift position information and PKB operation information.

In step S510, the vehicle information transmission unit 403 of the vehicle 2 transmits the acquired shift position information and the acquired PKB operation information to the center server 100 via the DCM 90.

In step S512, the vehicle information acquisition unit 1202 of the center server 100 acquires the shift position information and the PKB operation information received from the vehicle 2 by the communication processing unit 1201. Based on the shift position information and the PKB operation information acquired by the vehicle information acquisition unit 1202, the startup permission determination unit 1203 determines whether or not to permit the startup of the engine 30 based on the startup request transmitted from the terminal 200 to the center server 100. In this example, the startup permission determination unit 1203 determines that the transmission of the vehicle 2 cannot transmit the power of the engine 30 to the driving wheels and the parking brake is operating, and permits the startup of the engine 30 based on the startup request.

In step S514, when the startup permission determination unit 1203 of the center server 100 permits the startup of the engine 30 based on the startup request, the startup permission determination unit 1203 of the center server 100 transmits a notification indicating that the startup of the engine 30 based on the startup request is available (a remote startup availability notification) to the terminal 200 via the communication processing unit 1201 (an example of an availability notification transmission unit).

In step S516, when the remote startup availability notification from the center server 100 is received by the communication processing unit 2201, the display controller 2202 of the terminal 200 changes a display of the display 240 (an example of a display unit) from the application activation screen described above to the remote startup operation screen for performing various operations related to the remote operation of the vehicle 2 including transmission of the startup request to the center server 100, and the terminal 200 shifts to a mode for accepting a remote operation (a remote startup operation reception mode). As described above, the remote startup operation screen is displayed solely in a case where the engine 30 can be started up based on the startup request. As described above, when an operation for transmitting the startup request is performed with respect to the GUI of the operation screen by the user, the engine 30 of the vehicle 2 is necessarily started up as long as there is no communication disruption, failure of the vehicle 2, or the like. Therefore, it is possible to reliably reflect an operation intention of the user who wishes to start up the engine 30.

Figure 7:
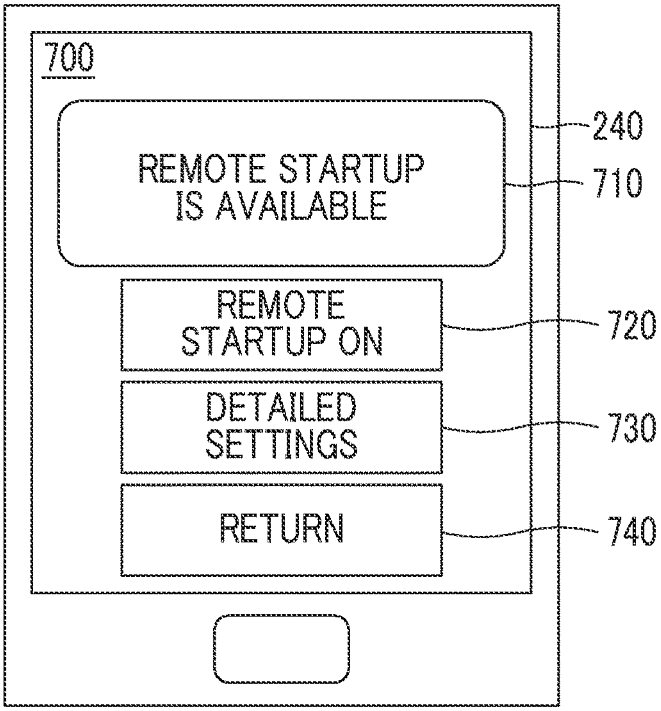
FIG. 7 is a diagram illustrating an example of a remote startup operation screen.

For example, FIG. 7 is a diagram illustrating an example (a remote startup operation screen 700) of the remote startup operation screen.

As illustrated in FIG. 7, a pop-up 710 is displayed on an upper portion of the remote startup operation screen 700 of the display 240. The fact that the startup of the engine 30 or the like based on the startup request can be performed is displayed in the pop-up 710.

Further, virtual buttons 720 to 740 for accepting an operation by the user are displayed in an area extending from a vertically central portion to a lower portion of the remote startup operation screen 700.

The button 720 is operation means for transmitting the startup request to the center server 100. Specifically, text information "Remote startup ON" is drawn. As described above, the user can transmit the startup request to the center server 100 to cause the engine 30 to be started up by operating the button 720.

Further, the button 730 is operation means for shifting to a setting screen for setting various setting pieces of content (a set temperature, a set operation time, or the like) included in the startup request. Specifically, text information "detailed setting" is drawn. As described above, the user can set various setting pieces of content regarding the startup request by operating the button 730.

Further, the button 740 is virtual operation means for returning from the screen to a home screen of the remote operation application. Specifically, text information "Back" is drawn.

Referring back to FIG. 5A, in step S518, the remote operation unit 2203 of the terminal 200 accepts an operation of transmitting a startup request (a remote startup operation) according to a predetermined operation with respect to the GUI displayed on the display 240 by the user.

In step S520, when the remote operation unit 2203 of the terminal 200 accepts the remote startup operation, the remote operation unit 2203 of the terminal 200 transmits a startup request including various setting pieces of content to the center server 100 via the communication processing unit 2201 (an example of a startup request transmission unit).

In step S522, when the startup request from the terminal 200 is received by the communication processing unit 1201, the remote operation controller 1204 of the center server 100 transfers the received startup request to the vehicle 2 via the communication processing unit 1201.

In step S524, when the startup request from the center server 100 is received by the DCM 90, the remote operation assistance controller 402 of the vehicle 2 sends an engine startup request and an air conditioning startup request to the engine controller 401 and the air conditioner ECU 20 to start up the engine 30 and the air conditioning device 10.

In step S526, the remote operation assistance controller 402 of the vehicle 2 transmits a startup notification indicating the startup of the engine 30 and the air conditioning device 10 to the center server 100 via the DCM 90.

In step S528, when the startup notification from the vehicle 2 is received by the communication processing unit 1201, the remote operation controller 1204 of the center server 100 transfers the startup notification to the terminal 200 via the communication processing unit 1201.

In step S530, when the end condition is satisfied after the startup of the engine 30, the remote operation assistance controller 402 of the vehicle 2 transmits an engine stop request and an air conditioning stop request to the engine controller 401 and the air conditioner ECU 20 to stop the engine 30 and the air conditioning device 10 (normal stop).

In step S532, the remote operation assistance controller 402 of the vehicle 2 transmits a stop notification indicating the stop of the engine 30 and the air conditioning device 10 to the center server 100 via the DCM 90.

In step S534, when the stop notification is received from the vehicle 2 via the communication processing unit 1201, the remote operation controller 1204 of the center server 100 transfers the stop notification to the terminal 200 via the communication processing unit 1201.

On the other hand, as illustrated in FIG. 5B, in step S512, in this example, the startup permission determination unit 1203 of the center server 100 determines that the transmission of the vehicle 2 is in a state in which the transmission of the vehicle 2 can transmit the power of the engine 30 to the driving wheels, or the parking brake is not operating, and does not permit the startup of the engine 30 based on the startup request.

In step S536, when the startup of the engine 30 based on the startup request is not permitted by the startup permission determination unit 1203, the remote operation controller 1204 of the center server 100 transmits to the terminal 200, a notification indicating that the startup of the engine 30 based on the startup request is unavailable (a remote startup unavailability notification) via the communication processing unit 1201 (an example of an availability notification transmission unit).

In step S538, when the remote startup unavailability notification from the center server 100 is received by the communication processing unit 2201, the display controller 2202 of the terminal 200 displays a notification indicating that the startup of the engine 30 based on the startup request is unavailable (a remote startup unavailability notification screen) on the display 240 (an example of the display unit). Accordingly, the terminal 200 shifts to a mode in which the startup of the engine 30 or the like based on the startup request is unavailable (a remote startup unavailability mode).

Figure 8:
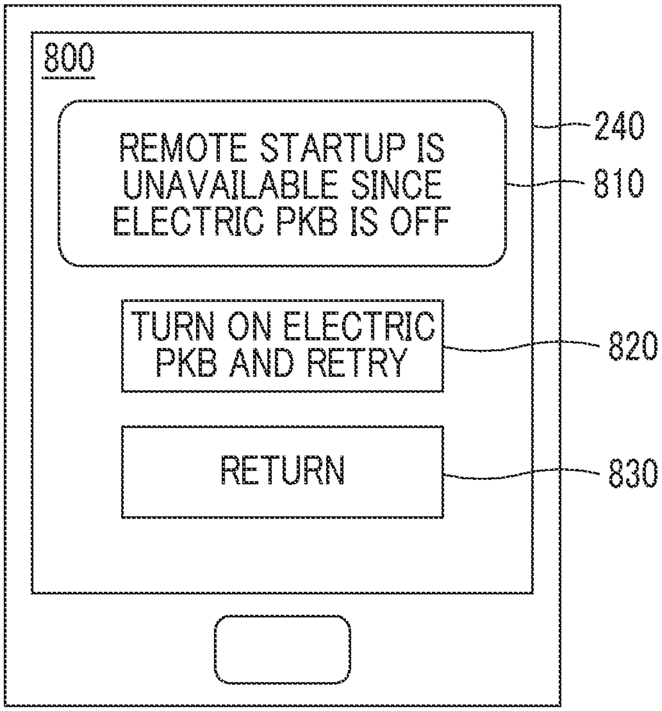
FIG. 8 is a diagram illustrating an example of a remote startup operation unavailability notification screen.

For example, FIG. 8 is a diagram illustrating an example (a remote startup unavailability notification screen 800) of a remote startup unavailability notification screen.

As illustrated in FIG. 8, a pop-up 810 is displayed in an upper area of the remote startup unavailability notification screen 800 of the display 240. Since an electric parking brake is not operated (OFF), an indication that the startup of the engine 30 or the like based on the startup request cannot be performed is displayed in the pop-up 810.

Buttons 820, 830 are displayed in an area ranging from the vertically central portion to the lower portion of the remote startup unavailability notification screen 800.

The button 820 is operation means for shifting to a mode in which a confirmation is made as to whether or not the startup of the engine 30 or the like based on the startup request is available again by remotely operating an electric parking brake (a remote startup availability confirmation mode). Specifically, text information "Turn on electric PKB and retry" is drawn on the button 820. In the above-described case, when the button 820 is operated by the user, the remote operation unit 2203 transmits a PKB operation request for operating the electric parking brake to the center server 100, so that the PKB operation request can be transmitted to the vehicle 2 via the center server 100 and the electric parking brake can be operated. As described above, the user operates the button 730 such that the user can confirm whether or not the startup of the engine 30 or the like based on the startup request is available again by operating the electric parking brake.

The button 830 is virtual operation means for returning from the screen to a home screen of the remote operation application. Specifically, text information "Back" is drawn.

Figure 9A:
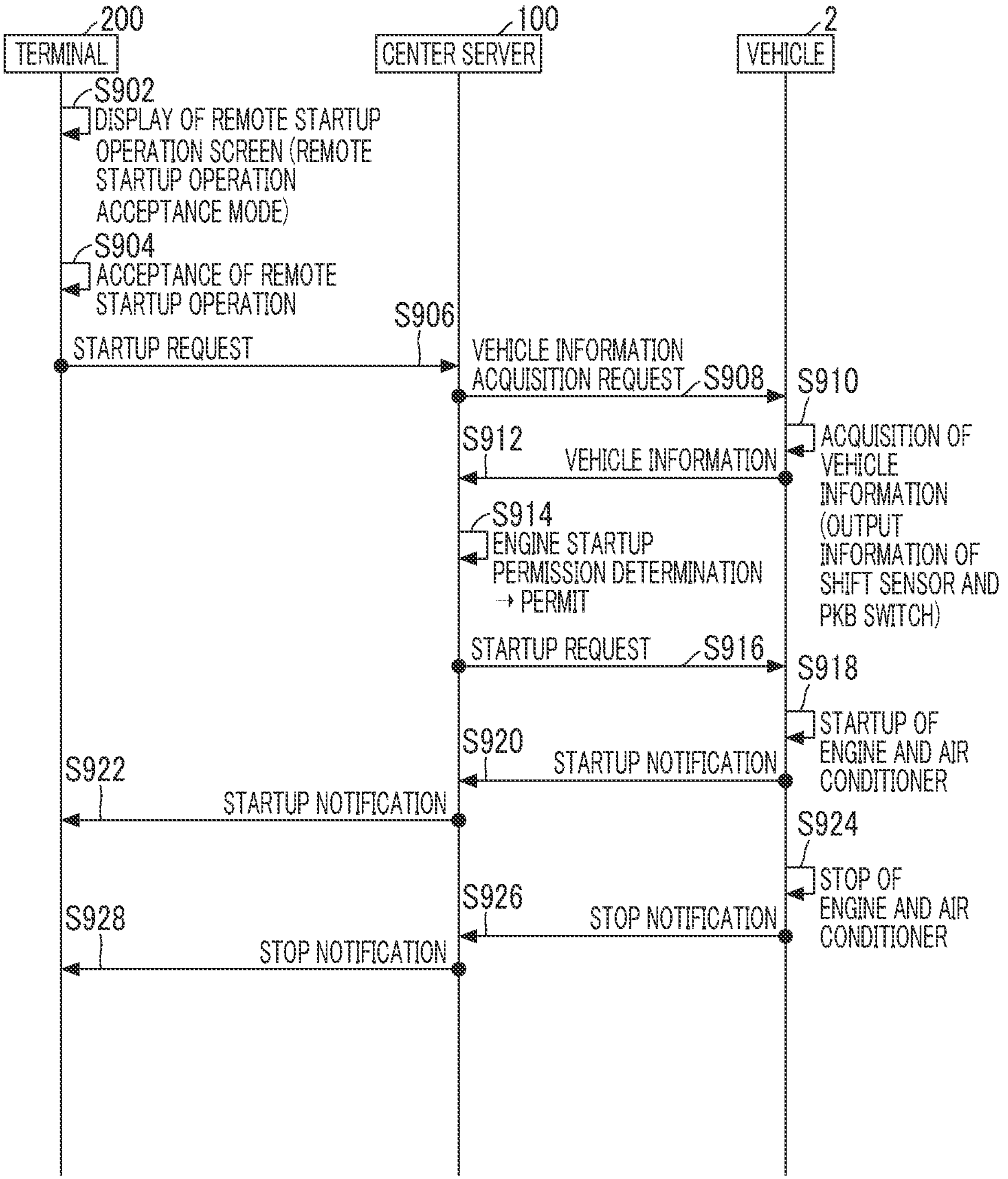
FIG. 9A is a sequence diagram illustrating another example of the operation of the remote startup system according to the first embodiment.
Figure 9B:
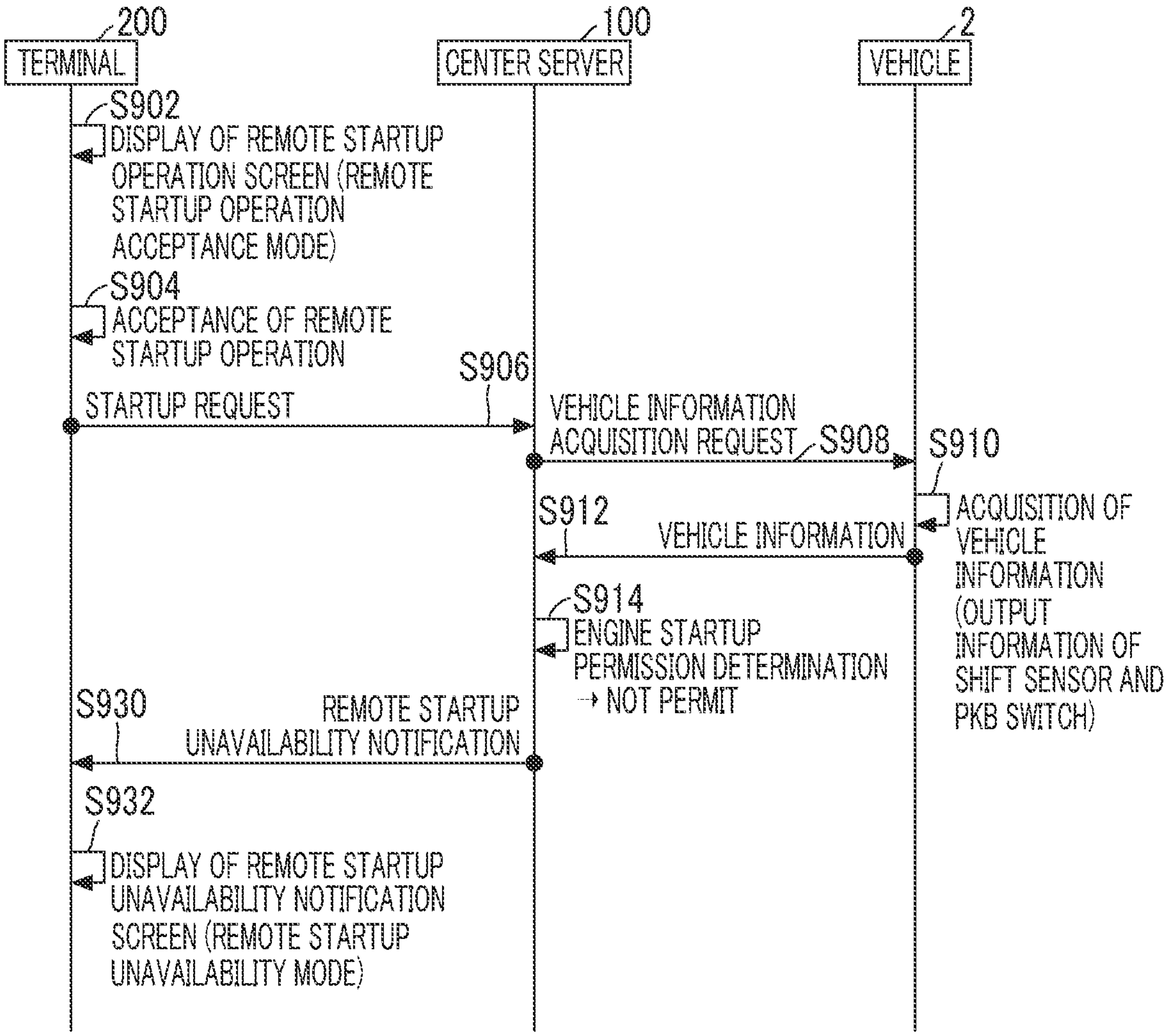
FIG. 9B is a sequence diagram illustrating another example of the operation of the remote startup system according to the first embodiment.

FIGS. 9A and 9B are sequence diagrams schematically illustrating another example of the operation of the remote startup system 1 according to the first embodiment. Specifically, FIG. 9A is a sequence diagram illustrating a specific example of the operation of the remote startup system 1 in a case where the startup permission determination unit 1203 permits startup of the engine 30 based on the startup request. FIG. 9B is a sequence diagram illustrating a specific example of the operation of the remote startup system 1 in a case where the startup permission determination unit 1203 does not permit the startup of the engine 30 based on the startup request. In this example, in the center server 100, the vehicle information acquisition unit 1202 acquires the vehicle information in response to the startup request transmitted from the terminal 200, and the startup permission determination unit 1203 performs the determination as to whether or not to permit the startup of the engine 30 or the like based on the startup request, unlike the examples shown in FIGS. 5A and 5B.

In FIGS. 9A and 9B, since steps S902 to S914 are the same processes, redundant description will be omitted.

Referring to FIG. 9A, in step S902, the display controller 2202 of the terminal 200 displays the remote startup operation screen on the display 240 when a remote operation application is activated according to a predetermined operation of the user with respect to the terminal 200, and the terminal 200 shifts to the remote startup operation reception mode.

Figure 10:
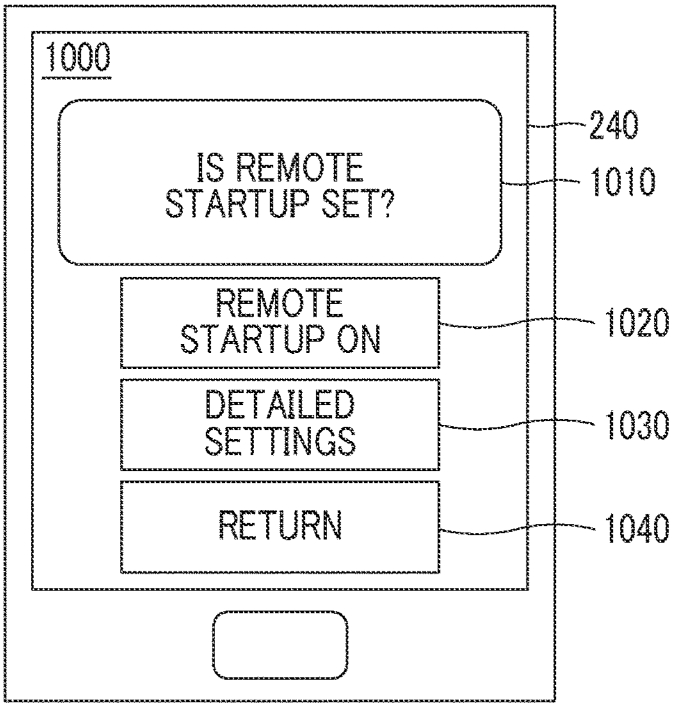
FIG. 10 is a diagram illustrating another example of the remote startup operation screen.

For example, FIG. 10 is a diagram illustrating another example (a remote startup operation screen 1000) of the remote startup operation screen.

As illustrated in FIG. 10, a pop-up 1010 is displayed in the upper portion of the remote startup operation screen 1000 of the display 240, as in the above example (FIG. 7). A question as to whether or not startup of the engine 30 or the like based on the startup request is performed, specifically, text information of "Do you want to set remote startup?" is drawn in the pop-up 1010.

Further, virtual buttons 1020 to 1040 for accepting an operation by the user corresponding to a question of the pop-up 1010 are displayed in an area from a vertically central portion to a lower portion of the remote startup operation screen 1000.

Since the virtual buttons 1020 to 1040 are the same as the buttons 720 to 740 in the above-described example, detailed description thereof will be omitted.

Referring back to FIG. 9A, in step S904, the remote operation unit 2203 of the terminal 200 accepts an operation of transmitting the startup request (a remote startup operation) according to a predetermined operation with respect to the GUI displayed on the display 240 by the user.

In step S906, when the remote operation unit 2203 of the terminal 200 accepts the remote startup operation, the remote operation unit 2203 of the terminal 200 transmits the startup request including various setting pieces of content to the center server 100 via the communication processing unit 2201.

In step S908, when the startup request from the terminal 200 is received by the communication processing unit 1201, the vehicle information acquisition unit 1202 of the center server 100 transmits a vehicle information acquisition request to the vehicle 2 via the communication processing unit 1201. As described above, this is limited to a case where a process of acquiring the vehicle information such as the shift position information or the PKB operation information in the vehicle information acquisition unit 1202 has an intention of the startup of the engine 30 by the user, that is, a case where the startup request has been transmitted to the center server 100. Thus, a useless inquiry from the center server 100 to the vehicle 2 can be suppressed, and as a result, a communication cost can be further suppressed.

Since steps S910 to S914 are the same as steps S508 to S512 in the example illustrated in FIG. 5A, description thereof will be omitted.

In step S916, when the startup of the engine 30 or the like based on the startup request is permitted by the startup permission determination unit 1203, the remote operation controller 1204 of the center server 100 transfers the startup request from the terminal 200 to the vehicle 2 via the communication processing unit 1201.

Since steps S918 to S928 are the same as steps S524 to S534 in the example illustrated in FIG. 5A, description thereof will be omitted.

On the other hand, as illustrated in FIG. 9B, in step S914, the startup permission determination unit 1203 of the center server 100 does not permit the startup of the engine 30 based on the startup request, as in step S512 of FIG. 5B.

In step S930, the remote operation controller 1204 of the center server 100 transmits a notification indicating that the startup of the engine 30 based on the startup request is unavailable (a remote startup unavailability notification) to the terminal 200 via the communication processing unit 1201, similarly to step S536 in the example illustrated in FIG. 5B.

Since step S932 is the same as step S538 in the example illustrated in FIG. 5B, description thereof is omitted.

Operation

As described above, in the first embodiment, the vehicle information acquisition unit 1202 acquires the information on the power transmission availability state of the power transmission device (for example, a transmission) that transmits the power of the engine 30 in the vehicle 2 to the driving wheels, and the information on the operation state of the rotation prevention device (for example, the parking brake) that prevents the rotation of the driving wheels when a function of transmitting the startup request included in the terminal 200, that is, the remote operation application has been activated or when the startup request from the terminal 200 is transmitted to the center server 100. Based on the information acquired by the vehicle information acquisition unit 1202, the startup permission determination unit 1203 determines whether or not to permit the startup of the engine 30 based on the startup request.

As described above, the information on the operation state of the power transmission device or the rotation prevention device is acquired, and a determination is made as to whether or not the startup of the engine 30 based on the startup request transmitted from the terminal 200 to the center server 100 is permitted, based on the acquired information. For example, a configuration in which the startup of the engine 30 based on the startup request transmitted from the terminal 200 to the center server 100 is not permitted in a case where the power transmission device is in a state in which the power transmission device can transmit the power of the engine 30 to the driving wheels or in a case where the rotation prevention device is released, for example, can be adopted. Therefore, it is possible to start up the engine 30 in consideration of the transmission availability state of the power transmission device, the operation state of the rotation prevention device, or the like of the vehicle 2. In other words, the startup of the engine 30 according to the remote operation from the terminal 200 is controlled via the center server 100, such that convenience for the user that the engine 30 can be started up from the terminal 200 and safety in consideration of the state of the power transmission device or the rotation prevention device of the vehicle 2 can be both achieved.

The vehicle information acquisition unit 1202 may acquire solely any one of the information on the power transmission availability state of the power transmission device and the information on the operation state of the rotation prevention device of the vehicle 2. In the above-described case, the startup permission determination unit 1203 permits the startup of the engine 30 based on the startup request in a case where the startup permission determination unit 1203 determines that the power transmission device of the vehicle 2 is in a state in which the power transmission device cannot transmit the power of the engine 30 to the driving wheels based on the information on the power transmission availability state of the power transmission device of the vehicle 2 acquired by the vehicle information acquisition unit 1202. On the other hand, the startup permission determination unit 1203 does not permit the startup of the engine 30 based on the startup request in a case where the startup permission determination unit 1203 determines that the power transmission device of the vehicle 2 is in a state in which the power transmission device can transmit the power of the engine 30 to the driving wheels. Further, the startup permission determination unit 1203 permits the startup of the engine 30 based on the startup request in a case where the startup permission determination unit 1203 determines that the rotation prevention device is operating based on the information on the operation state of the rotation prevention device acquired by the vehicle information acquisition unit 1202. On the other hand, the startup permission determination unit 1203 does not permit the startup of the engine 30 based on the startup request in a case where the startup permission determination unit 1203 determines that the rotation prevention device is not operating.

Further, the power transmission device of the vehicle 2 that is an information acquisition target of the vehicle information acquisition unit 1202 may include, for example, a single clutch provided in a power transmission path, in addition to the transmission.

Further, in the first embodiment, the remote operation controller 1204 starts up the engine 30 in a case where the startup request is transmitted from the terminal 200 to the center server 100 and the startup permission determination unit 1203 permits the startup of the engine 30 based on the startup request. On the other hand, even when the startup request is transmitted from the terminal 200 to the center server 100, the remote operation controller 1204 does not start up the engine 30 when the startup permission determination unit 1203 does not permit the startup of the engine 30 based on the startup request.

As described above, specifically, it is possible to reliably perform the startup of the engine 30 based on the startup request transmitted from the terminal 200 to the center server 100 solely in a case where the startup of the engine 30 has been permitted in consideration of the operation state of the power transmission device or the rotation prevention device of the vehicle 2.

In the first embodiment, the remote operation controller 1204 transmits a remote startup availability notification indicating that startup is possible to the terminal via the communication processing unit 1201 in a case where the startup permission determination unit 1203 determines that the startup of the engine 30 based on the startup request is permitted. On the other hand, the remote operation controller 1204 transmits a remote startup unavailability notification indicating that startup is not possible to the terminal 200 via the communication processing unit 1201 in a case where the startup permission determination unit 1203 determines that the startup of the engine 30 based on the startup request is not permitted.

As described above, in a case where the center server 100 performs a determination as to whether or not to permit the startup of the engine 30 in consideration of the operation state of the power transmission device or the rotation prevention device of the vehicle 2, the notification related to the determination result is transmitted to the terminal 200. Thus, it is possible to notify the user of the terminal 200 of the determination result, for example, through a display on the display 240.

The functions of the vehicle information acquisition unit 1202, the startup permission determination unit 1203, the remote operation controller 1204, and the like (including the function of the communication processing unit 1201 based on a request from the vehicle information acquisition unit 1202, the startup permission determination unit 1203, the remote operation controller 1204, or the like) may be provided in the vehicle 2. In the above-described case, the vehicle 2 receives the application activation notification, the startup request, or the like via the center server 100. Further, the functions of the vehicle information acquisition unit 1202, the startup permission determination unit 1203, the remote operation controller 1204, and the like may be provided in the terminal 200. In the above-described case, the terminal 200 may acquire the vehicle information (for example, the shift position information and the PKB information) from the vehicle 2 via the center server 100 and perform the permission determination as to the startup of the engine 30 based on the startup request. That is, the center server 100 may have a main function of relaying the startup request, the application activation notification, and the like transmitted from the terminal 200, the vehicle information acquisition request, and the like toward the vehicle 2 and also relaying a determination result of the determination as to whether or not to permit the startup of the engine 30 based on the startup request received from the vehicle 2, various notifications such as the remote startup availability notification and the remote startup unavailability notification, or the vehicle information (for example, the shift position information and the PKB operation information) to the terminal 200.

In the first embodiment, when the remote startup availability notification is received by the communication processing unit 2201, an operation screen for performing the startup of the engine 30 based on the startup request (a remote startup operation screen) is displayed on the display 240 of the terminal 200 under the control of the display controller 2202.

As described above, when the startup of the engine 30 based on the startup request is permitted, the operation screen for automatically performing startup of the engine 30 based on the startup request is displayed on the display 240 of the terminal 200. The operation screen may include, for example, an operation icon (for example, the button 720 in FIG. 7 or a button 1020 in FIG. 10) for transmitting the startup request. Therefore, the user can recognize that the startup of the engine 30 based on the startup request has been permitted without inquiring the availability of the startup of the engine 30 manually. Further, when the startup of the engine 30 based on the startup request has been permitted, it is possible to further improve convenience for the user since an effort of the user such as a manual operation of displaying the remote startup operation screen on the display 240 is reduced.

Further, in the first embodiment, when the communication processing unit 2201 receives the remote startup unavailability notification, the fact that startup of the engine 30 based on the startup request is unavailable is displayed on the display 240 of the terminal 200 under the control of the display controller 2202.

As described above, when the startup of the engine 30 based on the startup request has not been permitted, the fact that the startup of the engine 30 based on the startup request is unavailable is automatically displayed on the display 240 of the terminal 200. Therefore, the user can confirm that the startup of the engine 30 based on the startup request has not been permitted without manual inquiry.

In the first embodiment, when the remote startup availability notification is received by the communication processing unit 2201, the remote operation unit 2203 transmits the startup request to the center server 100 via the communication processing unit 2201 in response to a predetermined operation (for example, an operation with respect to the button 720) by the user.

As described above, in a case where the startup of the engine 30 based on the startup request has been permitted, the center server 100 is interposed and confirms the transmission of the startup request from the terminal 200 to the center server 100, that is, an intention of the startup of the engine 30 of the user, and then, the engine 30 of the vehicle 2 can be started up. Thus, it is possible to effectively prevent useless startup of the engine 30, for example, in a case where the intention of the user has changed during the permission determination process.

Second Embodiment

Next, a second embodiment will be described.

A remote startup system 1 according to the second embodiment differs from that according to the first embodiment in that the remote startup system 1 performs a characteristic operation in a case where the engine is started up based on the startup request, and then, the vehicle 2 has traveled as it is or is likely to travel without stopping. Hereinafter, the same or corresponding configurations as those of the first embodiment are denoted with the same reference numerals, and portions different from those in the first embodiment will be mainly described.

Configuration of Remote Startup System

First, a configuration of the remote startup system according to the second embodiment will be described with reference to FIGS. 11 and 12.

Figure 11:
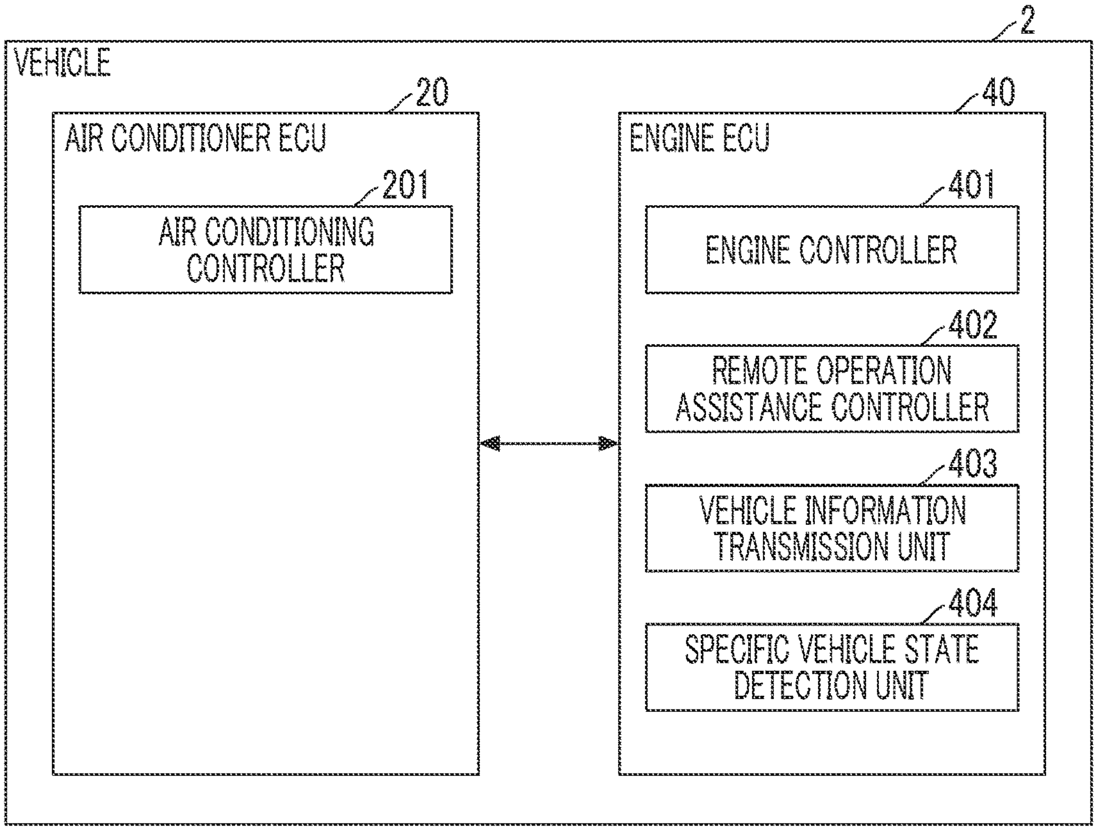
FIG. 11 is a functional block diagram illustrating an example of a functional configuration of a vehicle (an air conditioner ECU and an engine ECU) according to a second embodiment.
Figure 12:
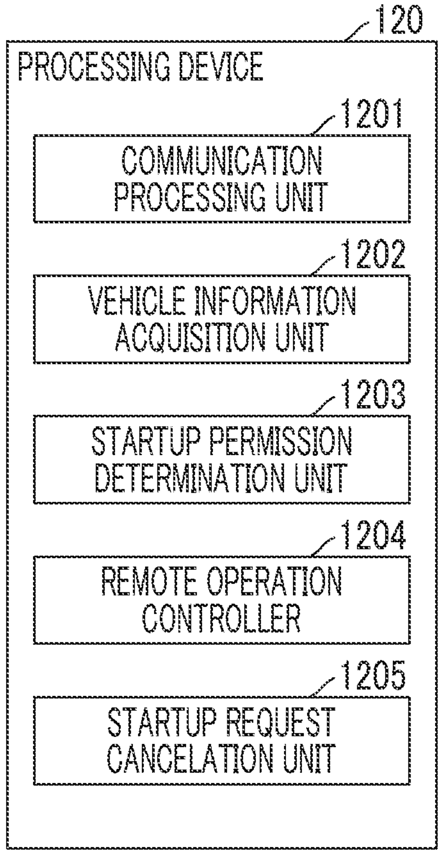
FIG. 12 is a functional block diagram illustrating an example of a functional configuration of a center server (a processing device) according to the second embodiment.

FIG. 11 is a diagram illustrating an example of a functional configuration of the vehicle 2 (the air conditioner ECU 20 and the engine ECU 40) according to the second embodiment. FIG. 12 is a functional block diagram illustrating an example of a functional configuration of a center server 100 (a processing device 120) according to the second embodiment.

An overall configuration of the remote startup system 1 and a functional configuration of the terminal 200 (a processing device 220) are illustrated in FIGS. 1 and 4, as in the first embodiment.

The vehicle 2 includes an air conditioning device 10, the air conditioner ECU 20, a room temperature sensor 21, an outside air temperature sensor 22, the engine 30, the engine ECU 40, a shift sensor 50, a PKB switch 60, a vehicle speed sensor 70, a body ECU 80, and a DCM 90, as in the first embodiment.

The engine ECU 40 includes, for example, an engine controller 401, a remote operation assistance controller 402, a vehicle information transmission unit 403, and a specific vehicle state detection unit 404, as functional units that are realized by executing one or more programs stored in a ROM or an auxiliary storage device on the CPU.

Based on the vehicle speed information input from the vehicle speed sensor 70 and the information on the locked or unlocked state of the door of the vehicle 2 (locking and unlocking information) input from the body ECU 80, the specific vehicle state detection unit 404 detects a specific vehicle state in the vehicle 2. Specifically, the specific vehicle state detection unit 404 detects a vehicle state in which the engine 30 is started up based on the startup request and the vehicle 2 travels or is likely to travel without stopping.

More specifically, for example, in a case where the engine 30 is started up based on the startup request transmitted from the terminal 200 to the center server 100 and being operated, the specific vehicle state detection unit 404 sequentially determines whether or not the vehicle 2 travels based on the vehicle speed information input from the vehicle speed sensor 70. In a case where the specific vehicle state detection unit 404 has determined that the vehicle 2 has traveled, that is, in a case where the specific vehicle state detection unit 404 has detected traveling of the vehicle 2, the specific vehicle state detection unit 404 transmits a notification indicating that the vehicle 2 has traveled (a vehicle travel notification) to the center server 100 via the DCM 90.

Further, for example, in a case where the engine 30 is started up based on the startup request transmitted from the terminal 200 to the center server 100 and being operated, the specific vehicle state detection unit 404 sequentially determines whether or not the door of the vehicle 2 is unlocked based on the locking and unlocking information input from the body ECU 80. In a case where the specific vehicle state detection unit 404 has determined that the door of the vehicle 2 is unlocked, that is, in a case where the specific vehicle state detection unit 404 has detected an operation of unlocking the door of the vehicle 2, the specific vehicle state detection unit 404 determines that an operation of the user in a stage before traveling (the unlocking operation) has been performed in the vehicle 2, and transmits a notification indicating that the user is likely to get on and the vehicle 2 is likely to travel (a vehicle travel likelihood notification) to the center server 100 via the DCM 90.

The terminal 200 includes a communication device 210 and a processing device 220, as in the first embodiment.

The processing device 120 includes, for example, a communication processing unit 1201, a vehicle information acquisition unit 1202, a startup permission determination unit 1203, a remote operation controller 1204, and a startup request cancelation unit 1205, as functional units that are realized by executing one or more programs stored in a ROM or an auxiliary storage device on the CPU.

In a case where the engine 30 is started up based on the startup request and being operated, the startup request cancelation unit 1205 (an example of a cancelation unit) cancels (invalidates) the startup request (the startup request serving as the trigger of startup of the engine 30 that is in operation) when the vehicle 2 has traveled or the vehicle 2 is likely to travel. In a case where the vehicle 2 travels as it is without stop of the engine 30 started up based on the startup request, there is a case where the startup request is held in a valid state. An example thereof is a case where the valid time is defined in the startup request. In the above-described case, with respect to the vehicle 2 parked after traveling solely for a time shorter than the valid time of the startup request in which the valid time has been defined, the startup of the engine 30 based on the startup request held in a valid state may be performed against an intention of the user. On the other hand, the startup request cancelation unit 1205 cancels the startup request and prevents the startup of the engine 30 based on the startup request in a case where the startup of the engine 30 based on the startup request held in a valid state may be performed against the intention of the user. As described above, it is possible to effectively avoid inconvenience as described above.

Detailed Operation of Remote Startup System

Next, an operation of the remote startup system 1 according to the second embodiment will be described in detail with reference to FIGS. 13 to 16.

Figure 13:
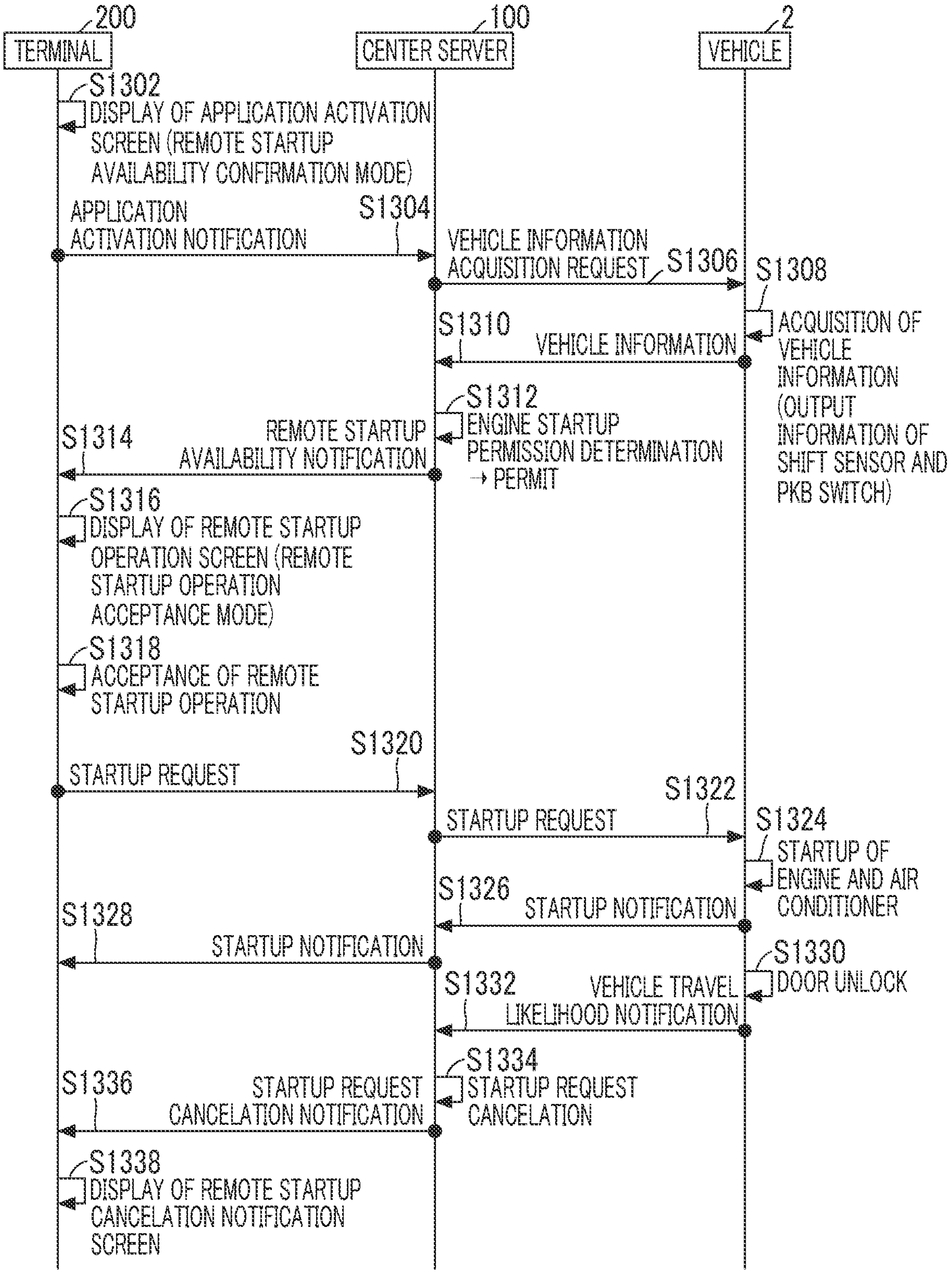
FIG. 13 is a sequence diagram illustrating an example of an operation of the remote startup system according to the second embodiment.

First, FIG. 13 is a sequence diagram schematically illustrating an example of the operation of the remote startup system 1 according to the second embodiment. More specifically, FIG. 13 is a diagram illustrating a specific example of the operation of the remote startup system 1 in a case where the startup permission determination unit 1203 permits the startup of the engine 30 based on the startup request.

Since steps S1302 to S1328 are the same as steps S502 to S528 of FIG. 5A of the first embodiment, description thereof will be omitted.

In step S1330, the specific vehicle state detection unit 404 of the vehicle 2 detects unlock of the door of the vehicle 2 based on the locking and unlocking information input from the body ECU 80 in a situation in which the engine 30 is started up based on the startup request and being operated.

In step S1332, the specific vehicle state detection unit 404 of the vehicle 2 transmits a notification indicating that the door of the vehicle 2 is unlocked and the vehicle 2 is likely to travel (vehicle travel likelihood notification) to the center server 100 via the DCM 90.

In step S1334, when the communication processing unit 1201 receives the vehicle travel likelihood notification from the vehicle 2, the startup request cancelation unit 1205 of the center server 100 cancels the startup request serving as a trigger of startup of the engine 30 that is in operation.

In step S1336, the startup request cancelation unit 1205 of the center server 100 transmits a notification indicating that the startup request has been canceled (a remote startup cancelation notification) to the terminal 200 via the communication processing unit 1201 (an example of a cancelation notification transmission unit).

In step S1338, when the remote startup cancelation notification is received by the communication processing unit 2201, the display controller 2202 of the terminal 200 displays a notification screen indicating that the startup of the engine 30 based on the startup request has been canceled (a remote startup cancelation notification screen) on the display 240.

Figure 14:
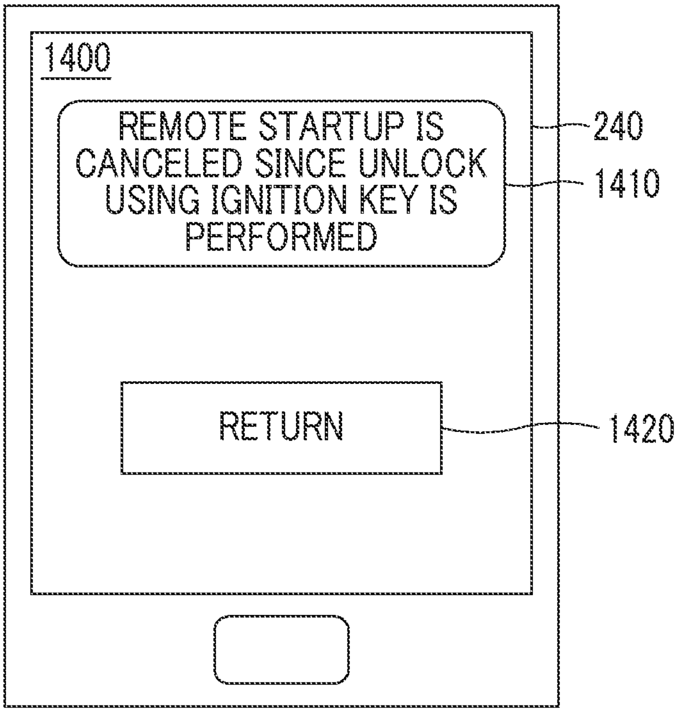
FIG. 14 is a diagram illustrating an example of a remote startup cancelation notification screen.

For example, FIG. 14 is a diagram illustrating an example of the remote startup cancelation notification screen (a remote startup cancelation notification screen 1400).

As illustrated in FIG. 14, a pop-up 1410 is displayed in an upper area of the remote startup cancelation notification screen 1400 of the display 240. Text information related to a notification indicating that the most recently transmitted startup request has been canceled by unlocking the door of the vehicle 2 during the operation of the engine 30 based on the startup request is drawn in the pop-up 1410.

Further, a button 1420 is displayed in the lower area of the display 240. The button 1420 is virtual operation means for returning from the screen to a home screen of the remote operation application. Specifically, text information "Back" is drawn.

Figure 15:
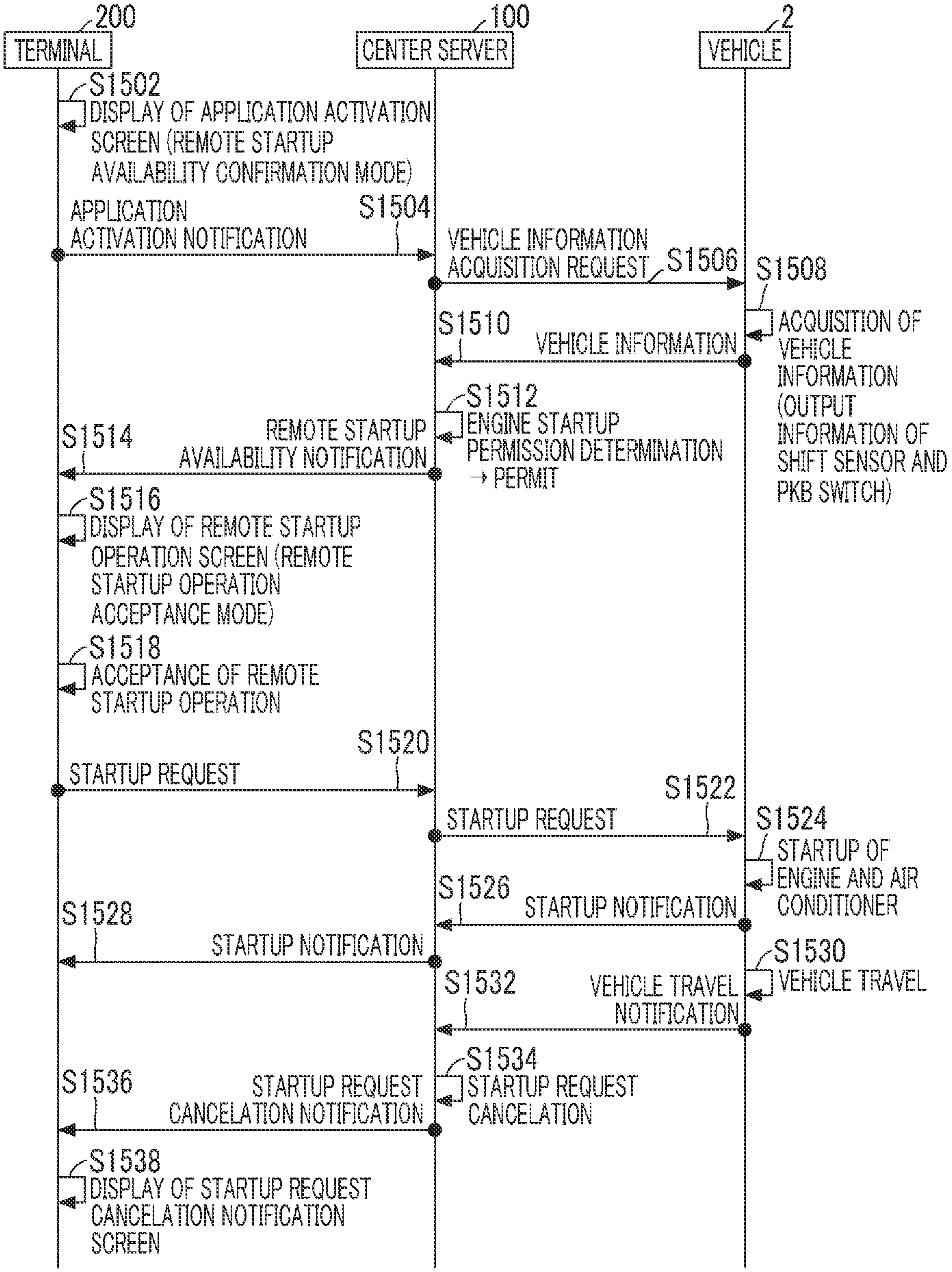
FIG. 15 is a sequence diagram illustrating another example of the operation of the remote startup system according to the second embodiment.

FIG. 15 is a sequence diagram schematically illustrating another example of the operation of the remote startup system 1 according to the second embodiment. Specifically, FIG. 15 is a diagram illustrating a specific example of the operation of the remote startup system 1 in a case where the startup permission determination unit 1203 permits startup of the engine 30 based on the startup request.

Since steps S1502 to S1528 are the same as steps S502 to S528 of FIG. 5A of the first embodiment, description thereof will be omitted.

In step S1530, the specific vehicle state detection unit 404 of the vehicle 2 detects travel of the vehicle 2 based on the vehicle speed information input from the vehicle speed sensor 70 in a situation in which the engine 30 is started up based on the startup request and being operated.

In step S1532, the specific vehicle state detection unit 404 of the vehicle 2 transmits a notification indicating that the vehicle 2 has traveled (a vehicle travel notification) to the center server 100 via the DCM 90.

In step S1534, when the communication processing unit 1201 receives the vehicle travel notification from the vehicle 2, the startup request cancelation unit 1205 of the center server 100 cancels the startup request serving as a trigger of startup of the engine 30 that is in operation.

In step S1536, the startup request cancelation unit 1205 of the center server 100 transmits a notification indicating that the startup request has been canceled (a remote startup cancelation notification) to the terminal 200 via the communication processing unit 1201 (an example of a cancelation notification transmission unit).

In step S1538, when the remote startup cancelation notification is received by the communication processing unit 2201, the display controller 2202 of the terminal 200 displays a notification screen indicating that the startup of the engine 30 based on the startup request has been canceled (a remote startup cancelation notification screen) on the display 240.

Figure 16:
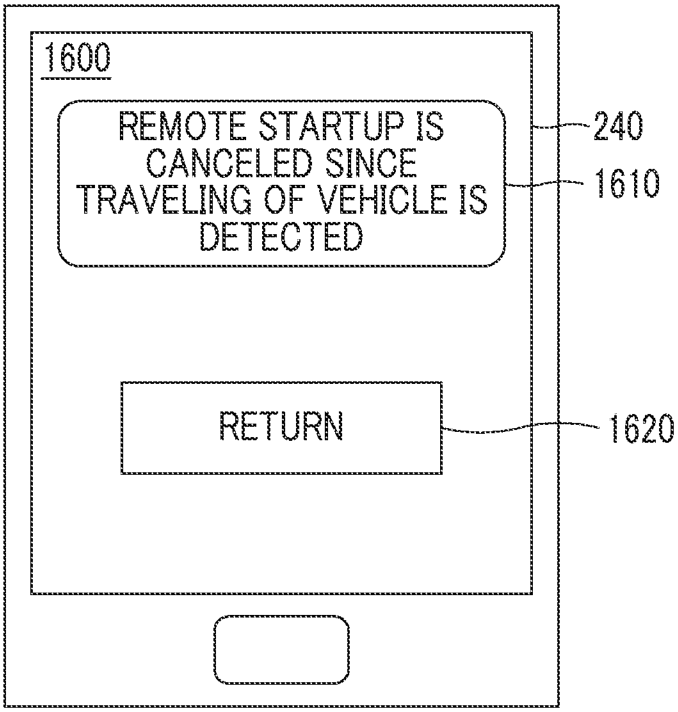
FIG. 16 is a diagram illustrating another example of the remote startup cancelation notification screen.

For example, FIG. 16 is a diagram illustrating an example of the remote startup cancelation notification screen (a remote startup cancelation notification screen 1600).

As illustrated in FIG. 16, a pop-up 1610 is displayed in an upper area of the remote startup cancelation notification screen 1600 of the display 240. Text information related to a notification indicating that the most recently transmitted startup request has been canceled by detecting the traveling of the vehicle 2 during the operation of the engine 30 based on the startup request is drawn in the pop-up 1610.

Further, a button 1620 having the same function as in the example illustrated in FIG. 14 is displayed in a lower area of the display 240.

Operation

As described above, in the second embodiment, in a case where the startup request is transmitted from the terminal 200 to the center server 100 and the engine 30 is started up and being operated, and in a case where the vehicle 2 has traveled or a case where an operation corresponding to a stage before the traveling of the vehicle 2 is performed with respect to the vehicle 2, the startup request cancelation unit 1205 cancels the startup of the engine 30 based on the startup request.

As described above, in a state in which the engine 30 is started up based on the startup request and being operated, even when the vehicle 2 has traveled or an operation of the user corresponding to a stage before the traveling of the vehicle 2 such as unlock of the door of the vehicle 2 is performed, the startup request is invalidated. Therefore, for example, when the vehicle 2 travels while the startup request remains valid without stopping after the engine 30 is started up based on the startup request, the startup of the engine 30 based on the startup request is likely to be performed again against an intention of the user when the vehicle 2 travels for a very short time within a range of a valid time and the vehicle 2 is parked again in a case where the valid time is defined in the startup request. Thus, it is possible to effectively avoid the situation as described above.

The specific vehicle state detection unit 404 may detect a predetermined operation including the opening of the door of the vehicle 2, seating at a driver's seat of the vehicle 2, an operation of releasing the parking brake, or the like, as well as the unlocking of the vehicle 2, as an operation by the user in a stage before the traveling of the vehicle 2. The specific vehicle state detection unit 404 may perform, for example, detection of an IG-ON operation (for example, a pressing operation of a power switch), detection of a release operation for the parking brake, detection of an operation of shifting the shift position of the transmission of the vehicle 2 to a travelable range, and detection of travelling of the vehicle 2 based on, for example, a change in position information of a GPS module (not illustrated) mounted on the vehicle 2, in addition to the vehicle speed information of the vehicle speed sensor 70.

Further, in the second embodiment, when the startup request is canceled by the startup request cancelation unit 1205, the remote operation controller 1204 transmits a startup request cancelation notification indicating that the startup request has been canceled to the terminal 200 via the communication processing unit 1201.

As described above, in a case where a process of canceling a valid startup request is performed in the center server 100, a cancelation notification is transmitted to the terminal 200 when the valid startup request is canceled. Thus, it is possible to notify the user of the terminal 200 that the valid startup request has been canceled, for example, by a display on the display 240 of the terminal 200.

The function of the startup request cancelation unit 1205 (including the function of the communication processing unit 1201 based on the request from the startup request cancelation unit 1205) may be provided in the vehicle 2. Further, in a case where the function of the remote operation controller 1204 (that is, the function of performing an overall control regarding the startup of the engine 30 based on the startup request) is provided in the terminal 200, the function of the startup request cancelation unit 1205 may be similarly provided in the terminal 200. Further, the function of the specific vehicle state detection unit 404 may be provided in the center server 100 or when the function of the startup request cancelation unit 1205 is provided in the terminal 200, the function of the specific vehicle state detection unit 404 may similarly be provided in the terminal 200.

Although the modes for carrying out the present disclosure has been described in detail above, the present disclosure is not limited to the specific embodiments as described above, and various modifications and changes can be made.

For example, although the remote startup system 1 starts up the engine 30 mounted on the vehicle 2 as the start target in the above-described embodiment, the remote startup system 1 may start up an electric motor (still another example of the driving device) when the vehicle 2 is the electric vehicle.

What is claimed is:

1. An in-vehicle device provided in a vehicle and configured to start an air conditioning device based on a startup request transmitted from a terminal of a user to start the air conditioning device, the air conditioning device being installed in the vehicle, the in-vehicle device comprising a cancelation unit configured to cancel the startup request when the vehicle has traveled or when an operation corresponding to a stage before traveling of the vehicle is performed with respect to the vehicle, after the startup request is transmitted from the terminal.

2. The in-vehicle device according to claim 1, wherein the startup request defines a valid time for starting the air conditioning device, and wherein the cancelation unit is configured to cancel the valid time when the vehicle has traveled or when the operation corresponding to the stage before traveling of the vehicle is performed with respect to the vehicle, after the startup request is transmitted from the terminal and before the air conditioning device is started by the startup request.

3. The in-vehicle device according to claim 1 further comprising a cancelation notification transmission unit, wherein the cancelation notification transmission unit is configured to transmit a cancelation notification indicating that the startup request has been canceled by the cancelation unit to the terminal.

4. A center server that is connected to a terminal of a user and a vehicle that is capable of communicating with the center server and that includes an in-vehicle device, the in-vehicle device being configured to start an air conditioning device based on a startup request to start the air conditioning device, the startup request being transmitted from the center server to the in-vehicle device after the startup request is transmitted from the terminal the air conditioning device being installed in the vehicle, the center server comprising a cancelation unit configured to cancel the startup request when the vehicle has traveled or when an operation corresponding to a stage before traveling of the vehicle is performed with respect to the vehicle, after the startup request is transmitted from the terminal.

5. The center server according to claim 4, wherein the startup request defines a valid time for starting the air conditioning device, and wherein the cancelation unit is configured to cancel the valid time when the vehicle has traveled or when the operation corresponding to the stage before traveling of the vehicle is performed with respect to the vehicle, after the startup request is transmitted from the terminal and before the air conditioning device is started by the startup request.

6. The center server according to claim 5 further comprising a cancelation notification transmission unit, wherein the cancelation notification transmission unit is configured to transmit a cancelation notification indicating that the startup request has been canceled by the cancelation unit to the terminal.

* * * * *